(12) United States Patent
Ergun

(10) Patent No.: US 8,738,675 B2
(45) Date of Patent: May 27, 2014

(54) RANDOM NUMBERS GENERATION USING CONTINUOUS-TIME CHAOS

(76) Inventor: Salih Ergun, Kocaeli (TR)

( * ) Notice: Subject to any disclaimer, the term of this patent is extended or adjusted under 35 U.S.C. 154(b) by 1249 days.

(21) Appl. No.: 12/375,017

(22) PCT Filed: Aug. 3, 2006

(86) PCT No.: PCT/TR2006/000035
§ 371 (c)(1),
(2), (4) Date: Jan. 24, 2009

(87) PCT Pub. No.: WO2008/016337
PCT Pub. Date: Feb. 7, 2008

(65) Prior Publication Data
US 2010/0005128 A1     Jan. 7, 2010

(51) Int. Cl.
*G06F 7/58*          (2006.01)
(52) U.S. Cl.
USPC .......................................... 708/251; 708/250
(58) Field of Classification Search
None
See application file for complete search history.

(56) References Cited

U.S. PATENT DOCUMENTS 3,790,768 A * 2/1974 Chevalier et al. ............. 708/251
6,218,973 B1 * 4/2001 Barrett et al. ................. 341/143

OTHER PUBLICATIONS

Ozoguz et al., "An Integrated Circuit Chaotic Oscillator and Its Application for High Speed Random Bit Generation," 2005, IEEE.*
Yalcin et al., "True Random Bit Generation From a Double-Scroll Attractor," Jul. 2004, IEEE Transactions on Circuits and Systems.*
Restituto et al., "Integrated Chaos Generators," May 2002, IEEE.*
Stojanovski et al., "Chaos-Based Random Number Generators—Part I: Analysis," Mar. 2001, IEEE Transactions on Circuits and Systems.*

* cited by examiner

*Primary Examiner* — Lewis A Bullock, Jr.
*Assistant Examiner* — Christine Dang
(74) *Attorney, Agent, or Firm* — Weiner & Burt P.C.; Irving M. Weiner; Pamela S. Burt

(57) ABSTRACT

Novel random number generation methods and random number generators (RNG)s based on continuous-time chaotic oscillators are presented. Offset and frequency compensation loops are added to maximize the statistical quality of the output sequence and to be robust against parameter variations and attacks. We have verified both numerically and experimentally that, when the one-dimensional section was divided into regions according to distribution, the generated bit streams passed the tests used in both the FIPS-140-2 and the NIST 800-22 statistical test suites without post processing. Numerical and experimental results presented in this innovation not only verify the feasibility of the proposed circuits, but also encourage their use as the core of a high-performance IC RNG as well. In comparison with RNGs based on discrete-time chaotic maps, amplification of a noise source and jittered oscillator sampling, it is seen that RNGs based on continuous-time chaotic oscillators can offer much higher and constant data rates without post-processing. In conclusion, we can deduce that the proposed circuits can be realized in integrated circuits and the use of continuous-time chaos with the proposed innovations is very promising in generating random numbers with very high throughput.

18 Claims, 15 Drawing Sheets

RANDOM NUMBERS GENERATION USING CONTINUOUS-TIME CHAOS

Figure 1:
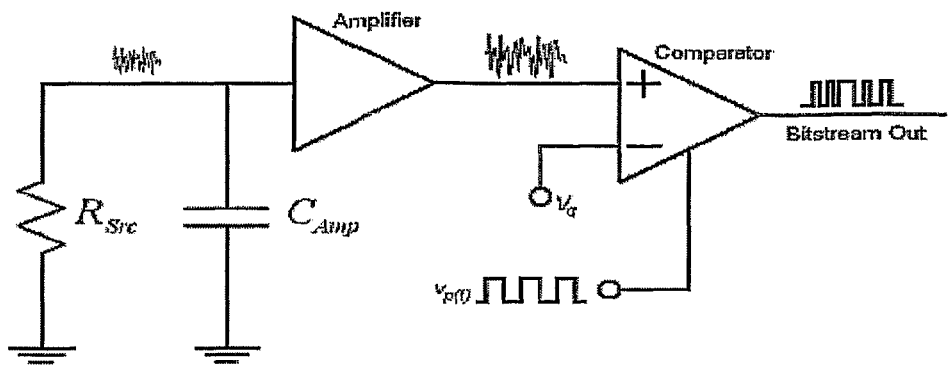

In the last decade, the increasing demand of electronic official & financial trans actions, the use of digital signature applications and the requirements of information secrecy have made the random number generators (RNGs) more popular. With this respect, RNGs, which have been generally used for military cryptographic applications in the past, have now an important role in design of a typical digital communication equipment.

Almost all cryptographic systems require unpredictable values, therefore RNG is a fundamental component for cryptographic mechanisms. Generation of public/private keypairs for asymmetric algorithms and keys for symmetric and hybrid crypto systems require random numbers. The onetime pad challenges, notices, padding bytes and blinding values are created by using truly random number generators (TRNGs) [1]. Pseudo-random number generators PRNGs) generate bits in a deterministic manner. In order to appear to be generated by a TRNG the pseudorandom sequences must be seeded from a shorter truly random sequence [2]. RNGs are also used in many areas including Monte Carlo analysis, computer simulations, statistical sampling, stochastic optimization methods, watermarking for image authentication, authentication procedure between two crypto equipments and initial value randomization of a crypto module that realizes an algorithm.

Even if RNG design is known, any useful prediction about the output can not be made. To fulfill the requirements for secrecy of one-time pad, key generation and any other cryptographic applications, the TRNG must satisfy the following properties. The output bit stream of the TRNG must pass all the statistical tests of randomness; the next random bit must be unpredictable [3]; the same output bit stream of the TRNG must not be able to reproduced [4]. The best way to generate true random numbers is to exploit the natural randomness of the real world by finding a random event that happens regularly [4]. Examples of such usable event include elapsed time during radioactive decay, thermal and shot noise, oscillator jitter and the amount of charge of a semiconductor capacitor [2].

There are few RNG designs reported in the literature; however fundamentally four different techniques were mentioned for generating random numbers: amplification of a noise source [5,6] jittered oscillator sampling [1, 7-9], discrete-time chaotic maps [10-14] and continuous-time chaotic oscillators [15, 18]. In spite of the fact that, the use of discrete-time chaotic maps in the realization of RNG is well-known for some time, it was only recently shown that continuous-time chaotic oscillators can be used to realize TRNGs also. Following up in this direction, we investigated the usefulness of the proposed innovations to generate random binary data from continuous-time chaotic oscillators.

The bit rates of RNGs commonly found in literature and commercial products became insufficient because of the increasing data rates of digital communication equipments. In comparison with RNGs based on discrete-time chaotic maps, amplification of a noise source and jittered oscillator sampling, it is seen that, RNGs based on continuous-time chaotic oscillators can offer much higher and constant data rates without post-processing with less complex integrated circuits. In conclusion, we can deduce that continuous-time chaotic oscillators can be integrated on today's process at GHz range and the use of continuous-time chaos with the proposed innovations is very promising in generating random numbers with very high throughput.

In order to be compatible with other system elements it is preferable to use chaotic oscillators that can be integrated on silicon. A number of attempts have been made to introduce discretetime as well as continuous-time CMOS chaotic oscillators. In most of these attempts, the resulting circuits were complicated and occupied a large silicon area. Discrete-time chaotic oscillators usually employ either switched-C or switched-current techniques. The utilization of a multiplier in addition to the many capacitors and op amps automatically result in a large circuit. In comparison with RNGs based on discrete-time chaotic sources it is seen that RNGs based on continuous-time, chaotic sources can offer much higher data rates with less complex and less noisy integrated circuits, particularly due to the absence of successive sample-and-hold stages.

Amplification of a noise source technique shown in FIG. 1, uses a high-gain high-bandwidth amplifier to process the white noise which has small ac voltage. The noise must be amplified to a level where it can be accurately thresholded with no bias by a clocked comparator. This is the most popular RNG technique for single-chip or boardlevel solutions.

In low voltage CMOS integrated circuits, two different noise mechanisms generate wideband white noise: shot noise (generated by current flow across a p-n junction) and thermal noise (generated by random electron motion in a resistor). Avalanche noise is not a practice choice for a noise source because of the typical high breakdown voltage (>6V DC) of Zener diodes fabricated in bulk CMOS processes. As shown in FIG. 1 the integrated noise source topology uses a large resistor as a thermal noise generator. Resistors are easily fabricated from polysilicon or diffusion layers and require no bias current to generate noise, as semiconductor junctions do. A polysilicon resistor also has a low flicker noise index (typically −30 dB), ensuring low 1/f noise levels.

Assuming negligible 1/f noise the thermal noise voltage of the source resistor $R_{Src}$ will be $E_t=\sqrt{4kTR_{Src}\Delta f}$ where k is Boltzman's constant, T is absolute temperature, $R_{Src}$ is the resistance, and $\Delta_f$ is the noise bandwidth. The noise bandwidth of $E_t$ is normally limited by the first-order low pass filter formed by $R_{Src}$ and the equivalent amplifier input capacitance $C_{Amp}$. Provided the −3 dB bandwidth of the amplifier is larger than the noise bandwidth, the total equivalent noise voltage $E_{ni}$ due to $E_t$ at the input of the amplifier will be $$E_{ni} = \sqrt{\frac{kT}{C_{Amp}}}$$

where it is the theoretical limit for thermal noise generated by a resistor shunted with a capacitor. Thermal noise voltage amplitude over a 1 Hz bandwidth can be increased by increasing the value of $R_{Src}$, but at the cost of reduced thermal noise bandwidth, such that $E_{ni}$ will remain constant for a given $C_{Amp}$.

The jittered oscillator sampling technique uses a random source that is derived from two free-running oscillators, one fast and the other one slower. Published RNG designs using this technique report that typical levels of oscillator jitter are not nearly sufficient to produce statistical randomness. For this reason a noise source is used to modulate the frequency of the slower clock, and with the rising edge of the noise-modulated slower clock fast clock is sampled. Drift between the two clocks thus provides the source of random binary digits. Similarly to amplification of a noise source technique, the noise must be amplified to a level where it can be used to modulate the frequency of the slower clock. The slower clock frequency, which determines the throughput data rate, is basically limited by the bandwidth of the noise signal used for modulation where the main reason of the limitation is the bandwidth of the amplifier.

In the proposed innovation waveform of the chaotic oscillator, which is in the order of a few volts with a nominal center frequency in the GHz range, was converted into binary sequences directly by a comparator without using an amplifier, where the theoretical limit for the throughput data rate is determined by the nominal center frequency of the chaotic oscillator which results in the order of a few Gbit/s. Such high data rates may render continuous-time RNGs attractive when compared to their counterparts based on the other techniques. Both an autonomous and a non-autonomous chaotic oscillator can be used as the core of the proposed RNG design where random data can be obtained from the 1-dimensional section or by periodically sampling one of the state of the chaotic system.

While comparing the proposed innovation with the previous RNG design based on a continuous-time chaotic oscillator given in [15], the proposed innovation have been numerically verified to be capable of rates 7 times of magnitude higher. Furthermore the sample bit sequence given at http://www.esat.kuleuven.ac.be/~mey/Ds2RbG/Ds2RbG.html fails in Block-frequency, Runs and Apen tests of full NIST test suite. Additionally, offset compensation loop, which was used in the proposed innovation to maximize the statistical quality of the output sequence and to be robust against parameter variations and attacks, is not feasible for the previous design given in [15] because of the reason that obtained bit sequence can pass the full test suite of Diehard thanks to Von Neumann processing.

Initially, we have numerically verified that the bit streams generated from the proposed innovation pass the four basic random number tests of FIPS-140-2 test suite [16]. External interference is a major concern in RNG design since interfered and random signals have comparable levels. To solve this problem and to be robust against parameter variations and attacks aimed to force throughput, we have proposed offset and frequency compensation loops that increase the statistical quality of the generated bit sequences. Moreover, we have also experimentally verified that the binary data obtained from the proposed innovations pass the tests of full NIST random number test suite [17].

Due to their extreme sensitivity to initial conditions and having a positive Lyapunov exponent and a noise-like power spectrum, chaotic systems lend themselves to be exploited for random number generation. In order to obtain random binary data from a continuous-time chaotic system, we have presented an interesting technique, which relies on generating a non-invertible binary data from the waveform of the given chaotic oscillator. It should be noted that non-invertibility is a key feature for generating PRNGs [19]. In the proposed innovation, to obtain binary random bits from an autonomous or a non-autonomous chaotic oscillator, we used the following:

1. Samples of the state $x_1$ from the 1-dimensional section obtained at the status transition of an other state ($x_2, x_3, \ldots$ or $x_n$) defined as $x_{2\ldots n}(t) = x_{2\ldots n(0)}$ with $dx_2, \ldots n/dt > 0$ or $dx_{2\ldots n}/dt < 0$.

2. Periodic samples of the state $x_1, x_2, \ldots$ or $x_n$ obtained at the rising edges of an external periodical pulse signal, that is at times t satisfying wtmod$2\pi = 0$ where w is the frequency of the pulse signal.

In the event of using a non-autonomous chaotic oscillator as the core of the proposed RNG design:

3. 1-dimensional section of the state $x_1$, obtained at the rising edges of the external periodical pulse signal (at times t satisfying wtmod$2\pi = t_0$ where w is the frequency of the pulse signal and $0 \le t_0 \le 1$) used to drive the non-autonomous chaotic oscillator, was also exploited to obtain binary random bits.

In the above defined sections $x_1, x_2, \ldots$ and $x_n$ are the normalized quantities of the chaotic oscillator used as the core of the proposed RNG. Note that, although n-dimensional trajectories in the $x_1$-$x_2$-$\ldots$-$x_n$ plane is invertible, one may obtain a non-invertible section by considering only the values corresponding to one of the states, say $x_1$.

Initially, we have numerically generated $x'_1$s and examined the distribution of sampled values to determine appropriate sections where the distribution looks like random signal. Although, we could not find sections of which $x_1$ values has a single normal or $X^2$ distribution [2] for different set of parameters, we determined various sections where the distribution of state $x_1$ has at least two regions. For appropriate set of parameters, the distribution of the state $x_1$ in the above defined sections seems like the given FIG. 2.

Figure 2:
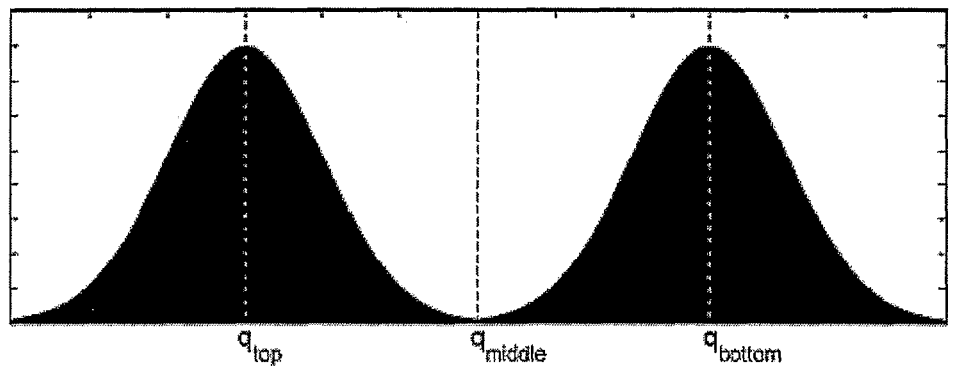

Distribution of $x_1$ having two regions, suggests us to generate random binary data from regional $x_1$ values for regional thresholds. Following this direction, we have generated the binary data $S_{(top)i}$ and $S_{(bottom)i}$ from the 1-dimensional sections according to the Equation 1:

$$S_{(top)i} = sgn(x_i - q_{top}) \text{ when } x_{1i} \ge q_{middle}$$

$$S_{(bottom)i} = sgn(x_{1i} - q_{bottom}) \text{ when } x_{1i} < q_{middle} \quad (1)$$

where sgn(.) is the signum function, $x_{1i}$'s are the values of $x_1$ obtained from one of the above defined sections, $q_{top}$ and $q_{bottom}$ are the thresholds for top and bottom distributions, respectively and $q_{middle}$ is the boundary between the distributions. To be able to choose the thresholds appropriately, we examined top and bottom distributions as shown in FIG. 2 and then, $q_{top}$ and $q_{bottom}$ were determined as the medians of the top and bottom distributions, respectively.

Generation of the binary sequence thus obtained does not so much dependent on $q_{middle}$ value, because for this boundary value, distribution density of x is minimum. However distribution density of x for threshold values ($q_{top}, q_{bottom}$) is maximum so the binary sequence obtained may be biased. In order to remove the unknown bias in this sequence, the well-known Von Neumann's de-skewing technique [20] can be employed. This technique consists of converting the bit pair 01 into the output 0, 10 into the output 1 and of discarding bit pairs 00 and 11. However, this technique decreases throughput because of generating approximately 1 bit from 4 bits.

To eliminate the bias, another method, $\otimes$ (exclusive-or) operation was exploited, instead of Von Neumann processing in order not to decrease throughput. The potential problem with the exclusive-or method is that a small amount of correlation between the input bits will add significant bias to the output [4]. The correlation coefficients of generated binary sequences $S_{top}$ and $S_{bottom}$ obtained from the above defined sections are calculated very close to 0 and it is determined that the generated binary sequences are independent. This was, in fact, expected as the chaotic systems are characterized by having a positive Lyapunov exponent [21], and the auto-correlation of the chaotic time-series vanish abruptly. According to this result, we have generated the new binary data $S_{(xor)i}$ by using the given Equation 2:

$$S_{(xor)i} = S_{(top)i} \otimes S_{(bottom)i} \quad (2)$$

The mean value ψ of the binary sequence $S_{xor}$ thus obtained, can be calculated by the given Equation 3:

$$\psi = \frac{1}{2} - 2\left(\mu - \frac{1}{2}\right)\left(\nu - \frac{1}{2}\right) \quad (3)$$

where the mean value of $S_{top}=\mu$ and the mean value of $S_{bottom}=\nu$. Thus if μ and ν are close to ½ then ψ is very close to ½. As a result, we have numerically verified that the bit sequence $S_{xor}$, which was obtained from various sections defined above for the appropriate threshold values according to procedure given in Equation 2, passed the tests of FIPS-140-2 test suite without Von Neumann processing. We called random number generation according to above procedure, as Regional—RNG.

Due to the lack of access to a suitable fabrication facility, we have chosen to construct the proposed innovations using discrete components in order to show the feasibility of the circuits and we have also experimentally generated bit streams. In Regional RNG, to obtain a non-invertible section only the $x_1$ variable was used and the voltage $v_1$, which corresponds to the variable $x_1$, was converted into binary sequences. To produce binary random bits from autonomous or a non-autonomous chaotic oscillator by using the periodic samples of $x_1$, the circuit shown in FIG. 3 was used. Output bit stream of the comparators were sampled and stored in binary format at the rising edge of the external periodical square-wave generator $v_p(t)$ to obtain $v_1$ values in the section defined as wtmod2π=0.

Figure 4:
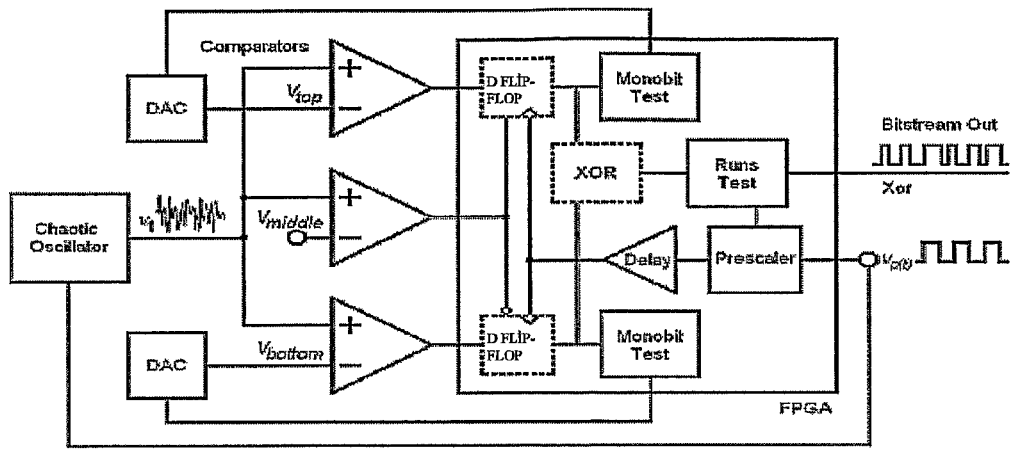

In order to implement the procedure where $x_1$ samples were used from the 1-dimensional section of an autonomous or a non-autonomous chaotic oscillator, obtained at the status transition of an other state $(x_2, x_3, \ldots$ or $x_n)$ defined as $x_{2\ldots n}(t)=x_{2\ldots n(0)}$ with $dx_{2\ldots n}/dt>0$ or $dx_{2\ldots n}/dt<0$, output bit stream of the $v_1$ comparators were sampled and stored in binary format at the rising or falling edges of the other state $v_{2\ldots n}$ comparator by using the circuit given in FIG. 4.

Figure 5:
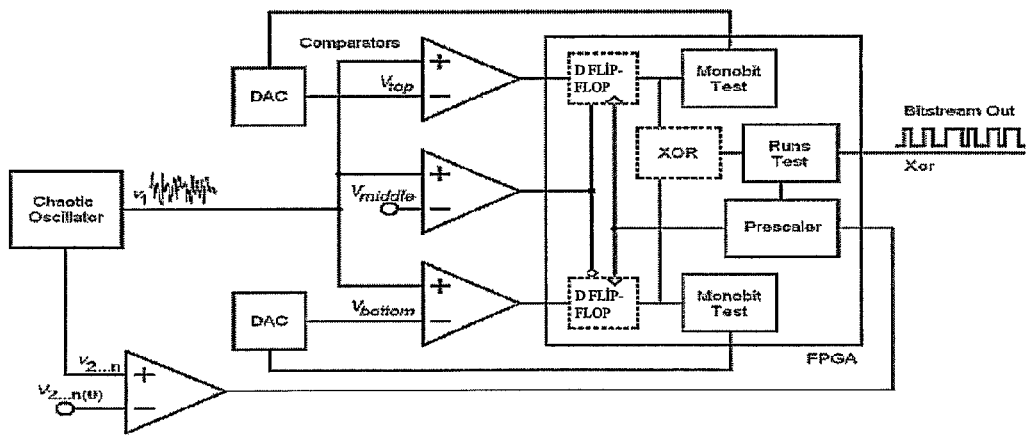

In the proposed innovation 1-dimensional section of $x_1$, from non-autonomous chaotic oscillator obtained at times t satisfying wtmod2π=$t_0$, can be also used to generate random bits. To obtain $x_1$ values in the section defined, output bit stream of the comparators were sampled and stored in binary format after a delay gate, at an adjusted time inside a period of the external periodical pulse train, $v_p(t)$ which is also used to drive the non-autonomous chaotic oscillator. Implementation circuit is shown in FIG. 5.

In regional random number generation circuits given above, the comparators were implemented from LM211 chips and the voltage levels $V_{top}$, $V_{middle}$ and $V_{bottom}$ were used to realize the thresholds in Equation 1 respectively. $V_{top}$ and $V_{bottom}$ were generated by two 12-bit voltage-mode digital to analog converters (DACs). Each DAC can be adjusted in 0, 5859375 mV steps where the voltage reference of the DAC is 2.4V. In implementation Eqn. 1 and Eqn. 2 transforms into:

$S_{(top)i}=sgn(v_{1i}-V_{top})$ when $v_{1i} \geq V_{middle}$ $S_{(bottom)i}=sgn(v_{1i}-V_{bottom})$ when $v_{1i} < V_{middle}$ $S_{(xor)i}=S_{(top)i} \otimes S_{(bottom)i} \quad (4)$ An FPGA based hardware, which has a PCI interface was designed to upload the binary data to the computer. Offset compensation for $V_{top}$ and $V_{bottom}$ thresholds, frequency compensation, delay gate and exclusive-or operation were implemented inside the FPGA. After offset & frequency compensation and exclusive-or operation, the candidate random numbers were uploaded to the computer through the PCI interface. Maximum data storage rate of our FPGA based hardware is 62 Mbps.

We have experimentally realized that, for appropriate set of parameters and adjusted sampling delays, there are various sections where the distribution of $v_1$ has two regions which seems like the FIG. 2.

To be able to determine initial values of the thresholds appropriately, similarly to numerical bit generation, top and bottom distributions were examined. Then, initial values of $V_{top}$ and $V_{bottom}$ were determined as the medians of the top and bottom distributions respectively. Sampling frequency of $v_1$ was determined by dividing the frequency of $v_p(t)$ or the output of $v_{2\ldots n}$ comparator into pre-scaler value inside the FPGA. For determining the initial value of the pre-scaler appropriately, the frequency spectrum of $v_1$ was observed which seems like the given FIG. 6. As shown in the figure chaotic signal $v_1$ has a noise-like power spectrum. The center frequency of the chaotic oscillator is indicated by the solid marker. Up to the dashed marker, the region in which the power spectrum is flat, chaotic signal $v_1$ contains all frequencies in equal amounts and power spectral density is at its maximum. Hence, without loss of generality, $v_1(t)$ and $v_1(t+t_0)$ can be considered as uncorrelated for all $t_0 \neq 0$ and $v_1$ can be sampled up to $f_{sampling}$ indicated by the dashed marker as a random signal source. Finally, initial value of the pre-scaler was determined by dividing the frequency of $v_p(t)$ or the output of $v_{2\ldots n}$ comparator into $f_{sampling}$.

Offset compensations of $V_{top}$ and $V_{bottom}$ thresholds were realized by implementing monobit test of FIPS-140-2-test suite [16] for $S_{top}$ and $S_{bottom}$ binary sequences. For each sequence, bit streams of length 20000 Bits were acquired, if the number of 0's>10275 then corresponding threshold was decreased and if the number of 0's<9725 then corresponding threshold was increased. Frequency compensations loop was realized by implementing runs test of FIPS-140-2 test suite for $S_{xor}$ binary sequence. If 3 $S_{xor}$ bit streams of length 20000 Bits which were acquired in sequence failed in runs test, which indicated over sampling of $v_1$, then sampling frequency of $v_1$ was scaled down by increasing the pre-scaler value. If necessary, sampling frequency can be scaled up externally through the PCI interface.

Figure 3:
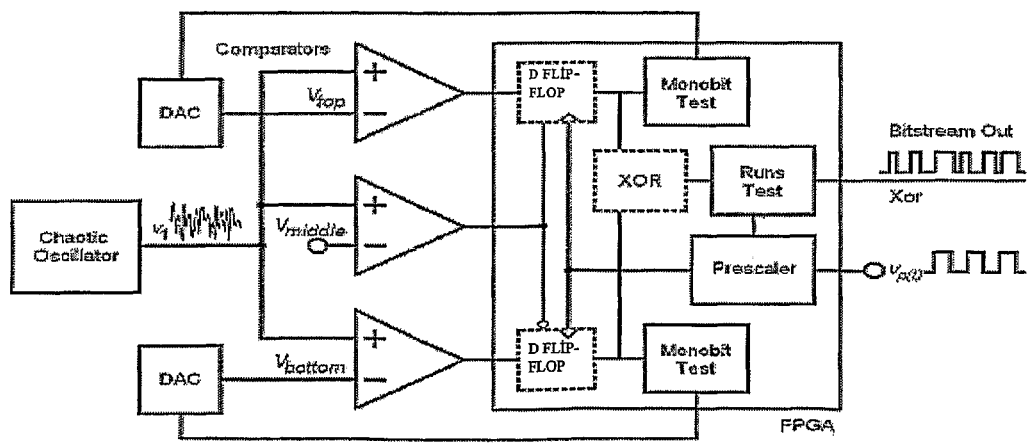

After pre-scaler and threshold values became stable, bit stream of length at least 500M Bits was acquired from the above defined sections by using the circuits given in FIG. 3, FIG. 4 and FIG. 5 and subjected to full NIST test suite. As a result, we have experimentally verified that, bit sequence $S_{xor}$, passed the tests of full NIST random number test suite without Von Neumann processing. P-values were uniform and the proportion of passing sequences were greater than the minimum pass rate for each statistical test.

Throughput data rate of $S_{xor}$ effectively becomes $$\left(\frac{f_{sampling}}{2}\right),$$

because of dividing $v_1$ into two regions according to distribution. Throughput data rate of $S_{xor}$ can be estimated as $$f_{xor} \approx \frac{0.05}{\tau}$$

where τ is the time constant of the chaotic oscillator. We can deduce that the chaotic oscillators can easily be integrated on today process with a nominal center frequency in the GHz range. However it should be noted that chaotic circuits operating at much higher frequencies are reported in literature. For example, cadence simulation results of the BJT version of a chaotic oscillator operating at 5.3 GHz is presented in [18]. So, all these indicate that the use of continuous-time chaos is very promising in generating random numbers with very high throughputs. As a result, the proposed method is also an enhanced architecture where offset and frequency compensation loops are added to maximize the statistical quality of the output sequence and to be robust against external interference, parameter variations and attacks aimed to force throughput.

APPLICATION TO INDUSTRY

2. Offset and Frequency Compensated True Random Number Generator Based on an Autonomous Chaotic Oscillator for Applications in Cryptography In the proposed design, we have obtained random data by periodically sampling one of the state of the chaotic system and numerically verified that the bit streams generated from the proposed RNG pass the four basic random number tests of FIPS-140-2 test suite. External interference is a major concern in RNG design since interfered and random signals have comparable levels. To solve this problem and to be robust against parameter variations and attacks aimed to force throughput, we have proposed offset and frequency compensation loops that increase the statistical quality of the generated bit sequences. Moreover, we have also experimentally verified that the binary data obtained from the chaotic oscillator pass the tests of NIST full random number test suite.

3. Autonomous Chaotic Oscillator
mobility, $C_{ox}$ is the MOS oxide capacitance and $$\frac{W}{L}$$

is the aspect ratio $M_1$-$M_2$ transistor pairs.

Using the normalized quantities: $R=\sqrt{L/C}$, $$x_1 = \frac{v_{C2} - v_{C1}}{2V_{ref}}, x_2 = \frac{v_{C2} + v_{C1}}{2V_{ref}},$$
$$y = \frac{\Delta i_L R}{2V_{ref}}, z = \frac{v_{C3}}{2V_{ref}},$$

$t_n = t/RC$, and taking $V_{ref} = V_{TH}$, the equation of the system in Eqn. 5 transforms into:

$$\dot{x}_1 = bx_1(x_2 - 1) - y \quad (6)$$
$$\dot{y} = x_1 - z$$
$$\dot{x}_2 = d - \frac{b}{2}[(x_2 - 1)^2 + x_1^2]$$

$$2\dot{z} = y - 2z + k \begin{cases} c & \text{if } x_1 \geq x_{sat} \\ \sqrt{2bc}\, x_1 \sqrt{1 - \left(\frac{x_1}{\sqrt{2}\, x_{sat}}\right)^2} & \text{if } |x_1| < x_{sat} \\ -c & \text{if } x_1 \leq -x_{sat} \end{cases}$$

where $b = \beta RV_{TH}$, $$c = \frac{I_0 R}{2V_{TH}},\ d = \frac{(kI_0 - I_B)R}{2V_{TH}}\ \text{and}\ x_{sat} = \frac{V_{sat}}{2V_{TH}} = \sqrt{\frac{c}{b}}.$$

Figure 8:
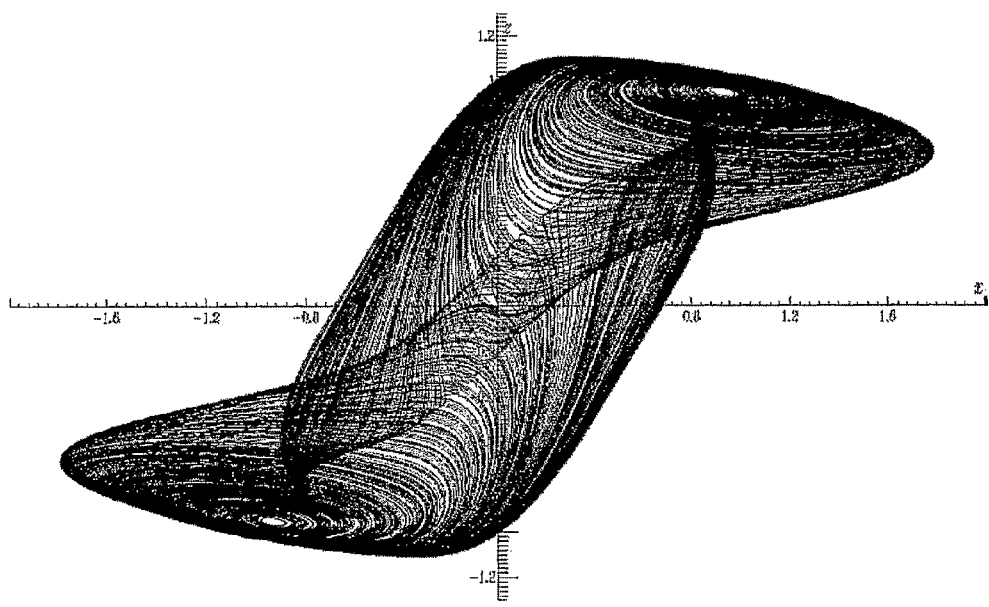

The equations in 6 generate chaos for different set of parameters. For example, the chaotic attractor shown in FIG. 8 is obtained from the numerical analysis of the system with b=0.9, c=0.15, d=0.7 and k=8 using a $4^{th}$-order Runge-Kutta algorithm with an adaptive step size.

The autonomous chaotic oscillator which is used as the core of the RNG was proposed in [18]. The MOS chaotic oscillator is presented in FIG. 7 and is derived from the classical cross coupled sinusoidal oscillator by adding an $RC_3$ section and a differential-pair stage ($M_3$-$M_4$). $M_9$-$M_8$ and $M_{10}$-$M_{11}$ transistor pairs are used to implement simple current mirrors with a current transfer ratio of k. Assuming that $C_1 = C_2 = C_3 = C$, routine analysis of the circuit yields the following Eqn. 5:

$$C(\dot{v}_{C2} - \dot{v}_{C1}) = \frac{\beta}{2}(v_{C2} - v_{C1})[(v_{C2} + v_{C1}) - 2V_{TH}] - \Delta i_L \quad (5)$$

$$L\Delta \dot{i}_L = v_{C2} - v_{C1} - v_{C3}$$

$$C(\dot{v}_{C2} + \dot{v}_{C1}) = kI_0 - I_B - \frac{\beta}{4}[(v_{C2} + v_{C1} - 2V_{TH})^2 + (v_{C2} - v_{C1})^2]$$

$$2C\dot{v}_{C3} = \Delta i_L - \frac{2v_{C3}}{R} +$$

$$k \begin{cases} I_0 & \text{if } v_{C2} - v_{C1} \geq V_{sat} \\ gm(v_{C2} - v_{C1}) \sqrt{1 - \left(\frac{v_{C2} - v_{C1}}{\sqrt{2}\, V_{sat}}\right)^2} & \text{if } |v_{C2} - v_{C1}| < V_{sat} \\ -I_0 & \text{if } v_{C2} - v_{C1} \leq -V_{sat} \end{cases}$$

where $\Delta i_L = i_L - i_R$ (Differential inductors' current), $g_m = \sqrt{\beta I_0}$, $$V_{sat} = \sqrt{\frac{2I_0}{\beta}},\ \beta = \mu_n C_{ox}\left(\frac{W}{L}\right)_{1,2};$$

$V_{TH}$ is the NMOS threshold voltage, $\mu_n$ is the electron mobility, $C_{ox}$ is the MOS oxide capacitance and $$\frac{W}{L}$$

is the aspect ratio of $M_1$-$M_2$ transistor pairs.

Using the normalized quantities: $R=\sqrt{L/C}$, $$x_1 = \frac{v_{C2} - v_{C1}}{2V_{ref}}, x_2 = \frac{v_{C2} + v_{C1}}{2V_{ref}},$$
$$y = \frac{\Delta i_L R}{2V_{ref}}, z = \frac{v_{C3}}{2V_{ref}},$$

$t_n = t/RC$, and taking $V_{ref} = V_{TH}$, the equations of the system in Eqn. 5 transforms into:

$$\dot{x}_1 = bx_1(x_2 - 1) - y \quad (6)$$

$$\dot{y} = x_1 - z$$

$$\dot{x}_2 = d - \frac{b}{2}[(x_2 - 1)^2 + x_1^2]$$

$$2\dot{z} = y - 2z + k \begin{cases} c & \text{if } x_1 \geq x_{sat} \\ \sqrt{2bc}\, x_1 \sqrt{1 - \left(\frac{x_1}{\sqrt{2}\, x_{sat}}\right)^2} & \text{if } |x_1| < x_{sat} \\ -c & \text{if } x_1 \leq -x_{sat} \end{cases}$$

where $b = \beta RV_{TH}$, $$c = \frac{I_0 R}{2V_{TH}},$$

$$d = \frac{(kI_0 - I_B)R}{2V_{TH}}$$

and $$x_{sat} = \frac{V_{sat}}{2V_{TH}} = \sqrt{\frac{c}{b}}.$$

The equations in 6 generate chaos for different set of parameters. For example, the chaotic attractor shown in FIG. 8 is obtained from the numerical analysis of the system with b=0.9, c=0.15, d=0.7 and k=8 using a $4^{th}$-Runge-Kutta algorithm with an adaptive step size.

Exploited chaotic oscillator offer some considerable advantages over the existing ones. Circuit employs a differential pair to realize the required nonlinearity, which is the most widely used basic analog building block due to its high IC performance. Moreover the chaotic oscillator is balanced; hence it offers better power supply rejection and noise immunity.

4 Circuit Simulation

Figure 7:
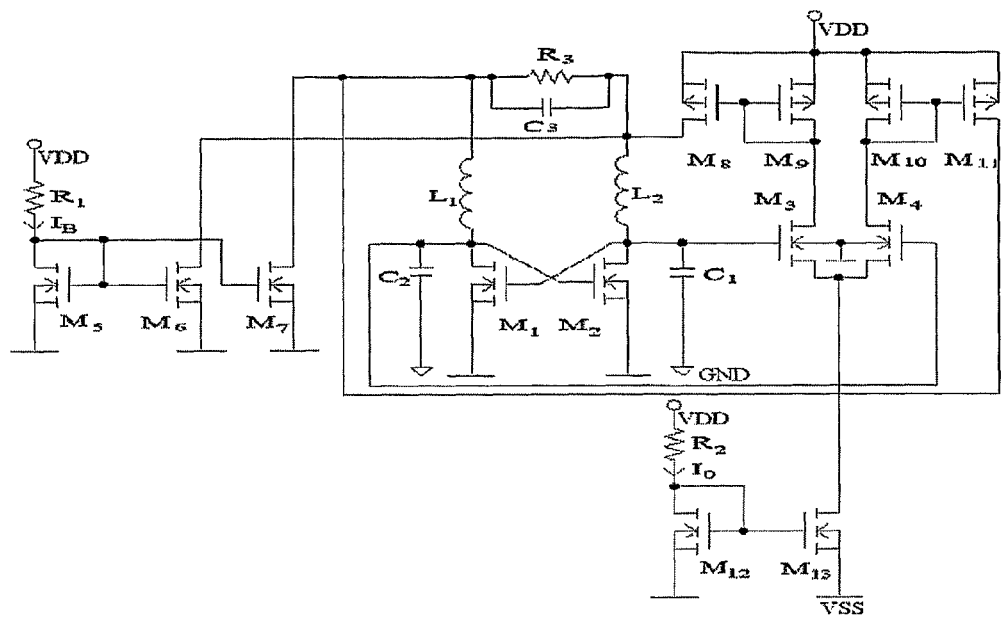

In order to show the high-frequency operation capability of the MOS chaotic oscillator, layout of the circuit given in FIG. 7 has been drawn using Cadence and the post-layout circuit has been simulated using SPICE (Level3) with the model parameters of 1.5μ CMOS process. The circuit was biased with ±2.5V power supply. The passive component values were: L=4.7 μH, C=4.7 pF, $$\left(f_0 = \frac{1}{2\pi\sqrt{LC}} \approx 33.9 \text{ MHz}\right),$$

Figure 9:
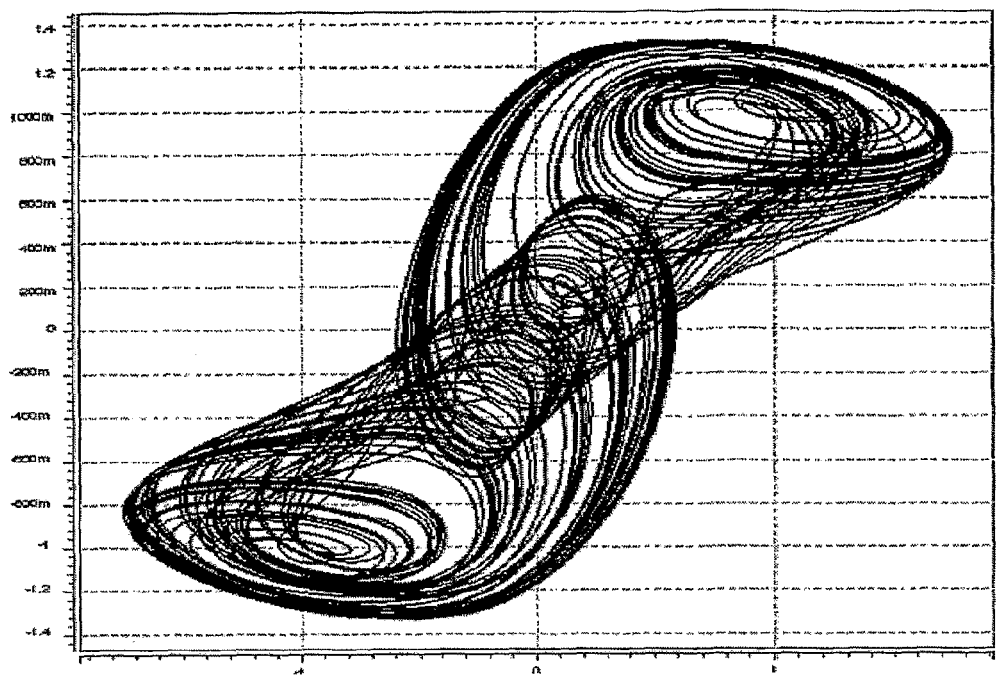

R=1000Ω and the biasing currents were $I_0$=240 μA, $I_B$=100 μA, respectively The observed phase-space corresponding to $v_{C2} - v_{C1}$ versus $v_{C3}$ is shown in FIG. 9.

It is clear that this MOS version of the chaotic oscillator requires off-chip inductors. Attempting to reduce the inductor values while maintaining functionality was not possible without increasing the supply voltages, biasing currents and the transistor aspect ratios. However, similar chaotic attractor was also obtained by using SPICE simulation with L=20nH, C=0.3 pF, ($f_0 \approx 2$ GHz), R=258Ω and with the model parameters of 0.35μ BiCMOS process whereas the supply voltages were ±2.5V and the biasing currents were $I_0$=1300 μA, $I_B$=400 μA. Finally, chaotic oscillator circuit is very suitable for monolithic implementation and capable of operating at very high frequencies.

5 Random Number Generation

Due to their extreme sensitivity to initial conditions and having a positive Lyapunov exponent and a noise-like power spectrum, chaotic systems lend themselves to be exploited for random number generation. In order to obtain random binary data from a continuous-time chaotic system, we have presented an interesting technique, which relies on generating a non-invertible binary data from the waveform of the given chaotic oscillator. It should be noted that non-invertibility is a key feature for generating PRNGs.

To obtain binary random bits from the chaotic attractor, we used the samples of the state $x_1$ of the system in Equation 6, obtained at the rising edges of an external periodical pulse signal, that is at times t satisfying wtmod2π=0 where w is the frequency of the pulse signal. Note that, although 4-dimensional trajectories in the $x_1$-y-$x_2$-z plane is invertible, one may obtain a non-invertible section by considering only the values corresponding to one of the states, say $x_1$.

Figure 10:
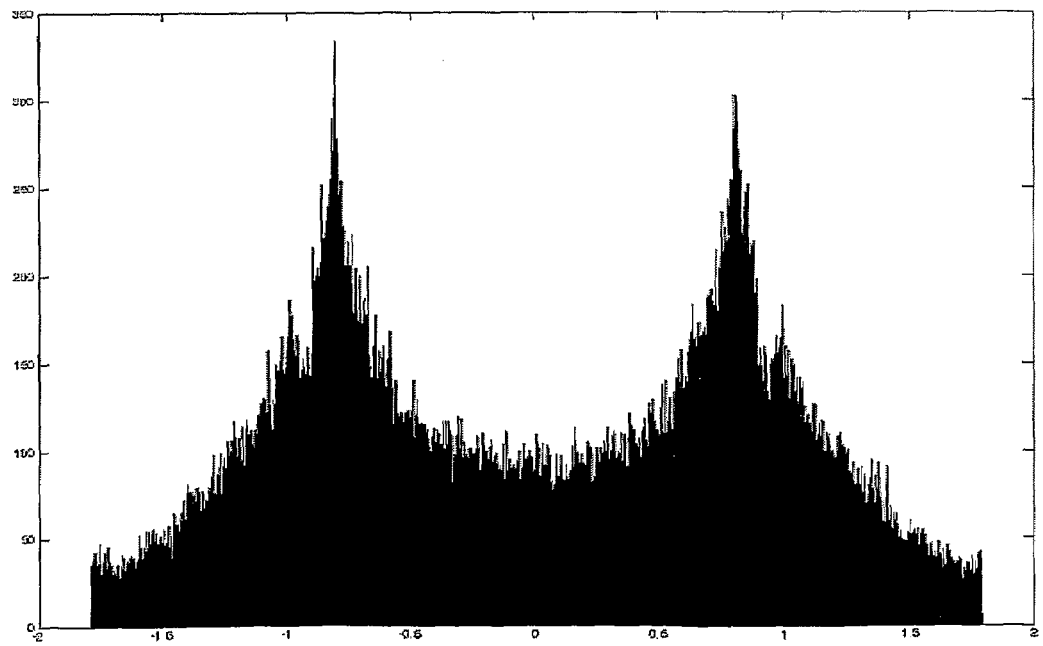

We initially examined the distribution of periodically sampled $x_1$ values to determine appropriate sections where the distribution looks like random signal. Although, we could not find sections of which $x_1$ values has a single normal or $x^2$ distribution for different set of parameters given in Equation 6, we determined various sections where the distribution of $x_1$ has at lest two regions. For b=0.9, c=0.15, d=0.7 and k=8, the distribution of the state $x_1$ in the above defined section is shown in FIG. 10.

Distribution of $x_1$ having two regions, suggests us to generate random binary data from regional $x_1$ values for regional thresholds. Following this direction, we have generated the binary data $S_{(top)i}$ and $S_{(bottom)i}$ the 1-dimensional section according to the Equation 7:

$$S_{(top)i} = sgn(x_{1i} - q_{top}) \text{ when } x_{1i} \geq q_{middle}$$

$$S_{(bottom)i} = sgn(x_{1i} - q_{bottom}) \text{ when } x_{1i} < q_{middle} \quad (7)$$

where sgn(.) is the signum function, $x_{1i}$'s are the values of $x_1$ at the 1-dimensional section obtained for tmod2π=0, $q_{top}$ and $q_{bottom}$ are the thresholds for top and bottom distributions, respectively and $q_{middle}$ is the boundary between the distributions. To be able to choose the thresholds appropriately, we examined top and bottom distributions as shown in FIG. 10 and then, $q_{top}$ and $q_{bottom}$ were determined as the medians of the top and bottom distributions which were 0.79569678515 and −0.7932956192, respectively when $q_{middle}$ was determined as 0.

Generation of the binary sequence thus obtained does not so much dependent on $q_{middle}$ value, because for this boundary value, distribution density of x is minimum. However, distribution density of x for threshold values ($q_{top}$, $q_{bottom}$) is maximum so the binary sequence obtained may be biased. In order to remove the unknown bias in this sequence, the well-known Von Neumann's de-skewing technique can be employed. This technique consists of converting the bit pair 01 into the output 0, 10 into the output 1 and of discarding bit, pairs 00 and 11. However, this technique decreases throughput, because of generating approximately 1 bit from 4 bits.

To eliminate the bias, another method, ⊗ (exclusive-or) operation was exploited, instead of Von Neumann processing in order not to decrease throughput. The potential problem with the exclusive-or method is that a small amount of correlation between the input bits will add significant bias to the output. The correlation coefficient of generated binary sequences $S_{top}$ and $S_{bottom}$ of length 196 KBits is calculated as 0.00446 and it is determined that the generated binary sequences are independent. This was, in fact, expected as the chaotic systems are characterized by having a positive Lyapunov exponent and the auto-correlation of the chaotic time-series vanish abruptly. According to this result, we have generated the new binary data $S_{(xor)i}$ by using the given Equation 8:

$$S_{(xor)i} = S_{(top)i} \otimes S_{(bottom)i} \qquad (8)$$

The mean value $\psi$ of the binary sequence $S_{xor}$ thus obtained, can be calculated by the given Equation 9:

$$\psi = \frac{1}{2} - 2\left(\mu - \frac{1}{2}\right)\left(\nu - \frac{1}{2}\right) \qquad (9)$$

where the mean value of $S_{top} = \mu$ and the mean value of $S_{bottom} = \nu$. Thus if $\mu$ and $\nu$ are close to ½ then $\psi$ is very close to ½. As a result, we have numerically verified that the bit sequence $S_{xor}$, which was obtained for the given appropriate threshold values according to procedure given in Equation 8, passed the tests of FIPS-140-2 test suite without Von Neumann processing. We called random number generation according to above procedure, as Regional—RNG.

6 Experimental Verification and Hardware Realization of RNGS

Figure 11:

Due to the lack of access to a suitable fabrication facility, we have chosen to construct the chaotic oscillator and the proposed RNGs using discrete components in order to show the feasibility of the circuits. For FIG. 7, the passive component values were: L=9 mH C=10 nF, R=1000Ω, $I_B$=100 μA and $I_0$=250 μA. The MOS transistors and the current sources, which were realized using simple current mirrors, were implemented with LM14007 CMOS transistor arrays, k was set equal to 8 by adjusting the ratio of the current mirror load resistors. The center operation frequency of the chaotic oscillator:

$$f_0 = \frac{1}{2\pi\sqrt{LC}},$$

was adjusted to a low frequency value as 16.77 KHz on purpose to provide the circuit not to be affected by parasitic capacitances. The circuit was biased with a ±5V power supply and the observed attractor is shown in FIG. 11. According to the procedure explained in Section 5, we have generated random bits regionally by periodically sampling one of the state of the chaotic oscillator.

6.1 Regional RNG

In Regional RNG, to obtain a non-invertible section only the $x_1$ variable was used and the voltage $v_1 = v_{C2} - v_{C1}$, which corresponds to the variable $x_1$, was converted into binary sequences. In order to implement this procedure the circuit shown in FIG. 18 was used. In this circuit, the comparators were implemented from LM211 clips and the voltage levels $V_{top}$, $V_{middle}$ and $V_{bottom}$ were used to realize the thresholds in Equation 7, respectively. $V_{top}$ and $V_{bottom}$ were generated by two 12-bit voltage-mode digital to analog converters (DACs). Each DAC can be adjusted in 0, 5859375 mV steps where the voltage reference of the DAC is 2.4V. In implementation Eqn. 7 and Eqn. 8 transforms into:

$$S_{(top)i} = sgn(v_{1i} - V_{top}) \text{ when } v_{1i} \geq V_{middle}$$

$$S_{(bottom)i} = sgn(v_{1i} - V_{bottom}) \text{ when } v_{1i} < V_{middle}$$

$$S_{(xor)i} = S_{(top)i} \otimes S_{(bottom)i} \qquad (10)$$

An FPGA based hardware, which has a PCI interface was designed to upload the binary data to the computer. To obtain x values in the section defined as tmod2π=0, output bit stream of the comparators were sampled and stored in binary format at the rising edge of the external periodical square-wave generator $v_p(t)$. Offset compensation for $V_{top}$ and $V_{bottom}$ thresholds, frequency compensation and exclusive-or operation were implemented inside the FPGA. After offset & frequency compensation and exclusive-or operation, the candidate random numbers were uploaded to the computer through the PCI interface. Maximum data storage rate of our FPGA based hardware is 62 Mbps.

Figure 12:
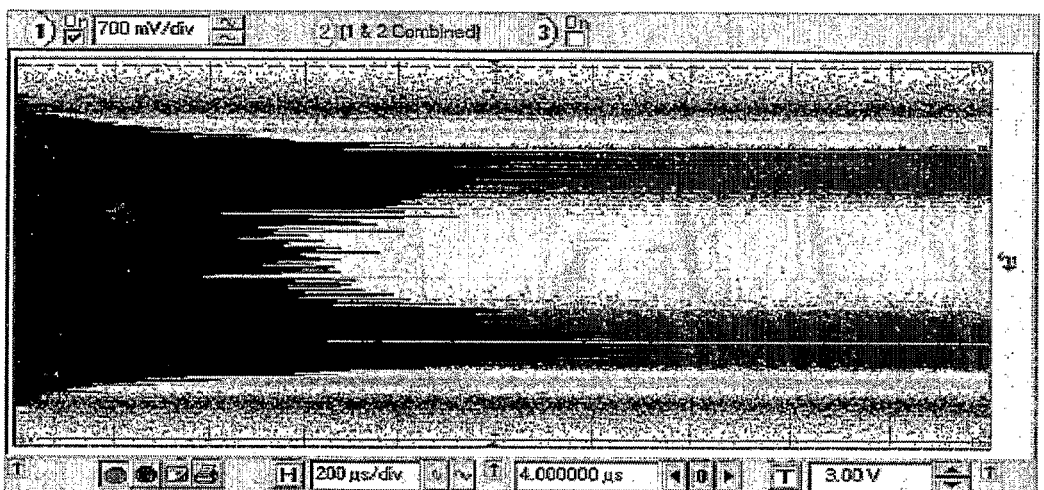

According to the procedure explained in Section 5, we examined the distribution of $v_1$. As a result, distribution of $v_1$ obtained at the rising edge of $v_p(t)$ is shown in FIG. 12.

To be able to determine initial values of the thresholds appropriately, similarly to numerical bit generation, top and bottom distributions were examined. Then, initial values of $V_{top}$ and $V_{bottom}$ were determined as the medians of the top and bottom distributions which were 1.114V and −1.122V, respectively while $V_{middle}$ was determined as 0 mV. Sampling frequency of $v_1$, was determined by dividing the frequency, of $v_p(t)$ into pre-scaler value inside the FPGA. For determining the initial value of the pre-scaler appropriately the frequency spectrum of $v_1$ given in FIG. 13 was observed. As shown in the figure chaotic signal $v_1$ has a noise-like power spectrum. The center frequency of the chaotic oscillator is indicated by the solid marker set at 17 KHz. Up to the dashed marker set at 4 KHz, the region in which the power spectrum is flat, chaotic signal $v_1$ contains all frequencies in equal amounts and power spectral density is at its maximum. Hence, without loss of generality, $v_1(t)$ and $v_1(t+t_0)$ can be considered as uncorrelated for all $t_0 \neq 0$ and $v_1$ can be sampled up to 4 KHz as a random signal source. Finally, initial value of the pre-scaler was determined as 6, while the frequency of $v_p(t)$ was 24 KHz.

Offset compensations of $V_{top}$ and $V_{bottom}$ thresholds were realized by implementing monobit test of FIPS-140-2 test suite for $S_{top}$ and $S_{bottom}$ binary sequences. For each sequence, bit streams of length 20000 Bits were acquired, if the number of 0's>10275 then corresponding threshold was decreased and if the number of 0's<9725 then corresponding threshold was increased. Frequency compensations loop was realized by implementing runs test of FIPS-140-2 test suite for $S_{xor}$ binary sequence. If 3 $S_{xor}$ bit streams of length 20000 Bits which were acquired in sequence failed in runs test, which indicated over sampling of $v_1$, then sampling frequency of $v_1$ was scaled down by increasing the pre-scaler value. If necessary, sampling frequency can be scaled up externally through the PCI interface.

After pre-scaler and threshold values became stable, bit stream of length 503 MBits was acquired and subjected to full NIST test suite, As a result, we have experimentally verified that, bit sequence $S_{xor}$, passed the tests of full NIST random number test suite without Von Neumann processing. Results for the uniformity of p-values and the proportion of passing sequences of the Regional RNG circuit are given in Table 1. It is reported that for a sample size of 503×1M Bits, the minimum pass rate for each statistical test with the exception of the random excursion (variant) test is approximately 0.976691.

When the center frequency of the chaotic oscillator was 16.77 KHz, pre-scaler values became stable at 7 and throughput data rate of $S_{xor}$ effectively becomes $$\left(\frac{24\text{ KHz}/7}{2}\right)1714\text{ bps,}$$

because of dividing $v_1$ into two regions according to distribution. Maximum throughput data rate of $S_{xor}$ can be estimated as $$f_{xor} = \frac{1714\sqrt{LC}}{\sqrt{L_{new}C_{new}}} = \frac{0.01626}{\sqrt{L_{new}C_{new}}}.$$

In Section 4, we have presented post-layout circuit simulation results, which leads to a center frequency of operation at ($f_0 \sim 33.9$ MHz). Considering that the circuit was realized on $0.35\mu$ BiCMOS process as given in Section 4 ($f_0 \sim 2$ GHz), we can deduce that the chaotic oscillator can easily be integrated on today process with a nominal center frequency in the GHz range. However, it should be noted that chaotic circuits operating at much higher frequencies are reported in literature. For example, cadence simulation results of the BJT version of the same chaotic oscillator operating at 5.3 GHz is presented in [18]. So, all these indicate that the use of continuous-time chaos is very promising in generating random numbers with very high throughput, of the order of hundreds Mbps.

TABLE 1

Results of the NIST test suite for Regional RNG.

| STATISTICAL TESTS | $S_{xor}$ | |
|---|---|---|
| | P-Value | Proportion |
| Frequency | 0.465415 | 0.9881 |
| Block Frequency | 0.382115 | 0.9920 |
| Cumulative Sums | 0.717714 | 0.9861 |
| Runs | 0.869278 | 0.9781 |
| Longest Run | 0.556460 | 0.9861 |
| Rank | 0.818343 | 0.9901 |
| FFT | 0.614226 | 0.9920 |
| Nonperiodic Templates | 0.697257 | 1.0000 |
| Overlapping Templates | 0.548314 | 0.9841 |
| Universal | 0.250558 | 0.9920 |
| Apen | 0.382115 | 0.9901 |
| Random Excursions | 0.425817 | 1.0000 |
| Random Excursions Variant | 0.961765 | 0.9969 |
| Serial | 0.399442 | 0.9881 |
| Linear Complexity | 0.305599 | 0.9940 |

7 Compensated True Random Number Generator Based on a Double-Scroll Attractor

In the proposed design, we initially have obtained random data by periodically sampling one of the state of the chaotic system and numerically verified that the bit streams generated from the proposed RNG pass the four basic random number tests of FIPS-140-2 test suite. External interference is a major concern in RNG design since interfered and random signals have comparable levels. To solve this problem and to be robust against parameter variations and attacks aimed to force throughput, we have proposed offset and frequency compensation loops that increase the statistical quality of the generated bit sequences. Finally we have experimentally verified that the binary data obtained from the proposed circuit pass the tests of NIST full random number test suite without post processing.

8 Double-Scroll Attractor

Figure 14:
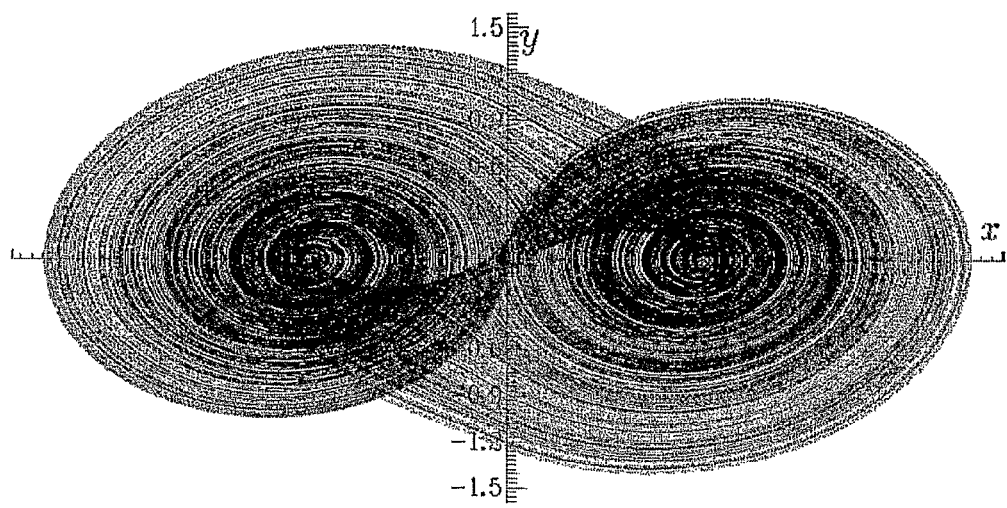

The double-scroll attractor which is used as the core of the RNG is obtained from a simple model given in [22], which is expressed by the Equation 11. It should be noted that when the nonlinearity is replaced by a continuous nonlinearity, the system is "qualitatively similar" to Chua's oscillator.

$$\dot{x}=y$$

$$\dot{y}=z$$

$$\dot{z}=ax-ay-az+sgn(x) \qquad (11)$$

where sgn(.) is the signum function. The equations in 11 generate chaos for different set of parameters. For example, the chaotic attractor shown in FIG. 14 is obtained from the numerical analysis of the system with $\alpha=0.666$ . . . using a $4^{th}$-order Runge-Kutta algorithm with an adaptive step size.

9 RANDOM BIT GENERATION

In order to obtain random binary data from a continuous-time chaotic system, we have presented an interesting technique, which relies on generating a non-invertible binary data from the waveform of the given chaotic system. It should be noted that non-invertibility is a key feature for generating pseudo random numbers.

To obtain binary random bits from the chaotic attractor, we used the samples of the state x of the system in Equation 11, obtained at the rising edges of an external periodical pulse signal, that is at times t satisfying wtmod2n=0 where w is the frequency of the pulse signal. Note that, although 3-dimensional trajectories in the x-y-z plane is invertible, one may obtain a non-invertible section by considering only the values corresponding to one of the states, say x.

Figure 15:
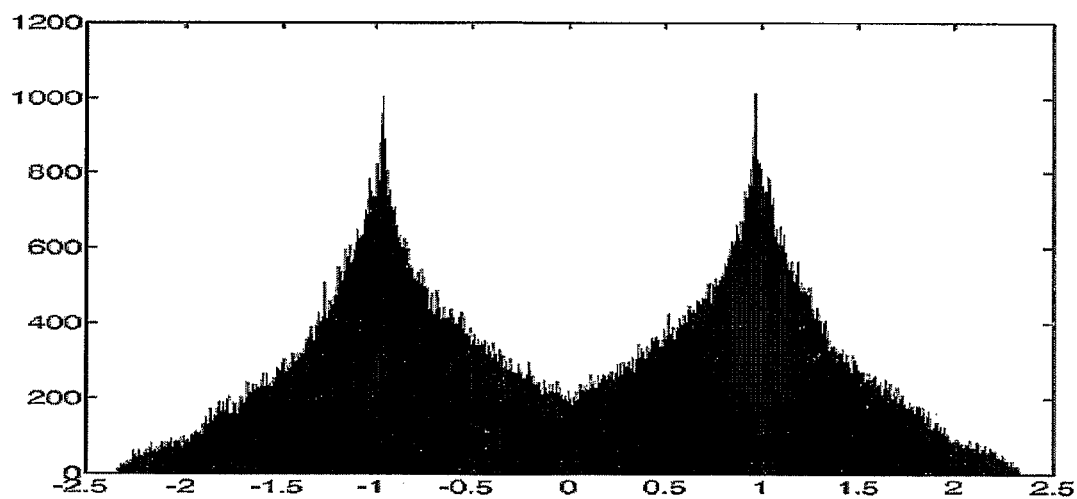

We initially examined the distribution of periodically sampled x values to determine appropriate sections where the distribution looks like random signal. Although, we could not find sections of which x values has a single normal or $X^2$ distribution for different values of $\alpha$ given in Equation 11, we determined various sections where the distribution of x has at least two regions. For $\alpha=0.666$..., the distribution of the state x in the above defined section is shown in FIG. 15.

Distribution of x having two regions, suggests us to generate random binary data from regional x values for regional thresholds. Following this direction, we have generated the binary data $S_{(top)i}$ and $S_{(bottom)i}$ from the 1-dimensional section according to the Equation 12:

$$S_{(top)i}=sgn(x_i-q_{top}) \text{ when } x_i \geq q_{middle}$$

$$S_{(bottom)i}=sgn(x_i-q_{bottom}) \text{ when } x_i < q_{middle} \qquad (12)$$

where $x_i$'s are the values of x at the 1-dimensional section obtained for $\frac{1}{2}$tmod$2\pi=0$ (w=$\frac{1}{2}$), $q_{top}$ and $q_{bottom}$ are the thresholds for top and bottom distributions, respectively and $q_{middle}$ is the boundary between the distributions. To be able to choose the thresholds appropriately, we examined top and bottom distributions as shown in FIG. 15 and then, $q_{top}$ and $q_{bottom}$ were determined as the medians of the top and bottom distributions which were 0.9656158849 and −0.9640518966, respectively when $q_{middle}$ was determined as 0.

Generation of the binary sequence thus obtained does not so much dependent on $q_{middle}$ value, because for this boundary value, distribution density of x is minimum. However, distribution density of x for threshold values ($q_{top}$, $q_{bottom}$) is maximum so the binary sequence obtained may be biased. In order to remove the unknown bias in this sequence, the well-known Von Neumann's de-skewing technique can be employed. This technique consists of converting the bit pair 01 into the output 0, 10 into the output 1 and of discarding bit pairs 00 and 11. However, this technique decreases throughput because of generating approximately 1 bit from 4 bits.

To eliminate the bias, another method, ⊗ (exclusive-or) operation was exploited instead of Von Neumann processing in order not to decrease throughput. The potential problem with the exclusive-or method is that a small amount of correlation between the input bits will add significant bias to the output. The correlation coefficient of generated binary sequences $S_{top}$ and $S_{bottom}$ of length 152 KBits is calculated as 0.00018 and it is determined that the generated binary sequences are independent. This was, in fact, expected as the chaotic systems are characterized by having a positive Lyapunov exponent, and the auto-correlation of the chaotic time-series vanish abruptly. According to this result, we have generated the new binary data $S_{(xor)i}$ by using the given Equation 13:

$$S_{(xor)i} = S_{(top)i} \otimes S_{(bottom)i} \qquad (13)$$

The mean value $\psi$ of the binary sequence $S_{xor}$ thus obtained, can be calculated by the given Equation 14:

$$\psi = \frac{1}{2} - 2\left(\mu - \frac{1}{2}\right)\left(\nu - \frac{1}{2}\right) \qquad (14)$$

where the mean value of $S_{top} = \mu$ and the mean value of $S_{bottom} = \nu$. Thus if $\mu$ and $\nu$ are close to ½ then $\psi$ is very close to ½. As a result, we have numerically verified that the bit sequence $S_{xor}$, which was obtained for the given appropriate threshold values according to procedure given in Equation 13, passed the tests of FIPS-140-2 test suite without Von Neumann processing. We called random number generation according to above procedure, as Regional—RNG.

10 Hardware Realization of RNG

Due to the lack of access to a suitable fabrication facility, we have chosen to construct the proposed circuit using discrete components in order to show the feasibility of the circuit.

10.1 Experimental Verification of Chaotic Oscillator

Figure 16:
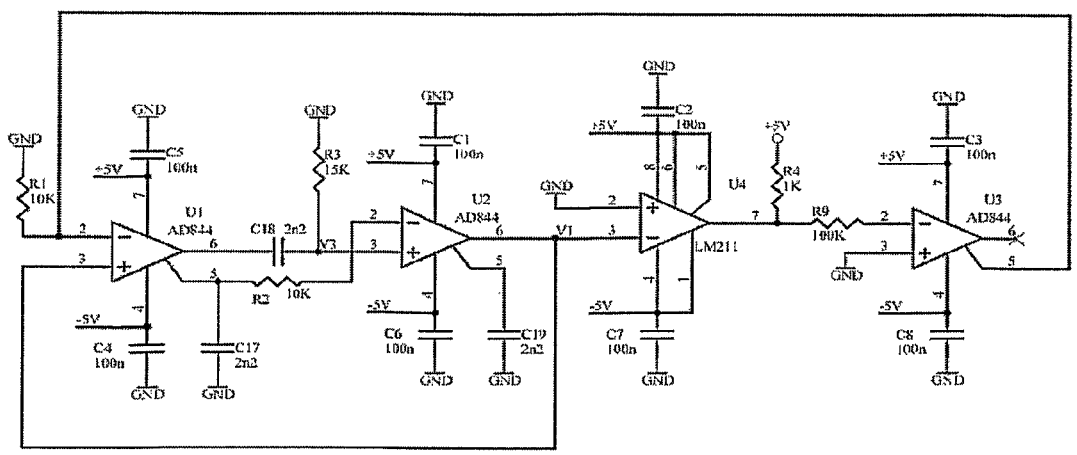

The circuit diagram realizing the double-scroll attractor is given in FIG. 16. AD844 is used as a high speed operational amplifier and LM211 voltage comparator is used to realize required nonlinearity. The passive component values were taken as: $R_1 = R_2 = \alpha R_3 = R = 10$ k Ω, $R_3 = 15$ kΩ for $\alpha = 0.666\ldots$, $C_{17} = C_{18} = C_{19} = C2.2$nF, and $R_K = 100$ kΩ.

Figure 17:
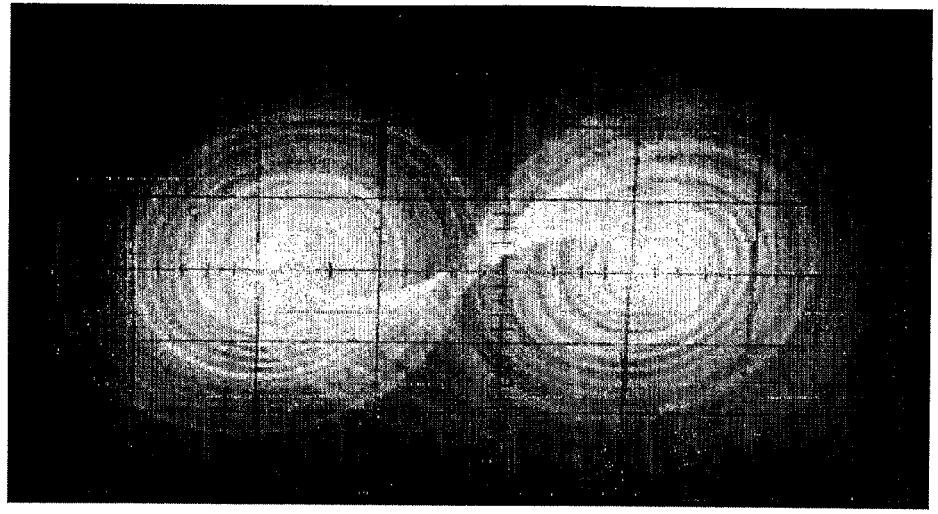

Therefore the center operation frequency of the chaotic oscillator:

$$f = \frac{1}{2\pi\tau}$$

corresponding to time constant $\tau$ where $\tau = RC$, was adjusted to a low frequency value as 7.234 KHz on purpose to provide the circuit not to be affected by parasitic capacitances. The circuit, was biased Path a±5V power supply and the observed attractor is shown in FIG. 17.

10.2 Regional RNG

In Regional NG, the voltage $v_1$, which corresponds to the variable x, was converted into binary sequences according to the procedure explained in Section 9. In order to implement this procedure, the circuit shown in FIG. 18 was used. In this circuit, the comparators were implemented from LM211 chips and the voltage levels $V_{top}$, $V_{middle}$ and $V_{bottom}$ were used to realize the thresholds in Equation 12, respectively. $V_{top}$ and $V_{bottom}$ were generated by two 12-bit voltage-mode digital to analog converters (DACs). Each DAC can be adjusted in 0, 5859375 mV steps where the voltage reference of the DAC is 2.4V.

An FPGA based hardware, which has a PCI interface was designed to upload the binary data to the computer. To obtain x values in the section defined as wtmod2π=0, output bit stream of the comparators were sampled and stored in binary format at the rising edge of the external periodical squarewave generator $v_p(t)$. Offset compensation for $V_{top}$ and $V_{bottom}$ thresholds, frequency compensation and exclusive-or operation were implemented inside the FPGA. After offset & frequency compensation and excusive-or operation, the candidate random numbers were uploaded to the computer through the PCI interface. Maximum data storage rate of our FPGA based hardware is 62 Mbps.

10.3 Offset and Frequency Compensation

Figure 19:
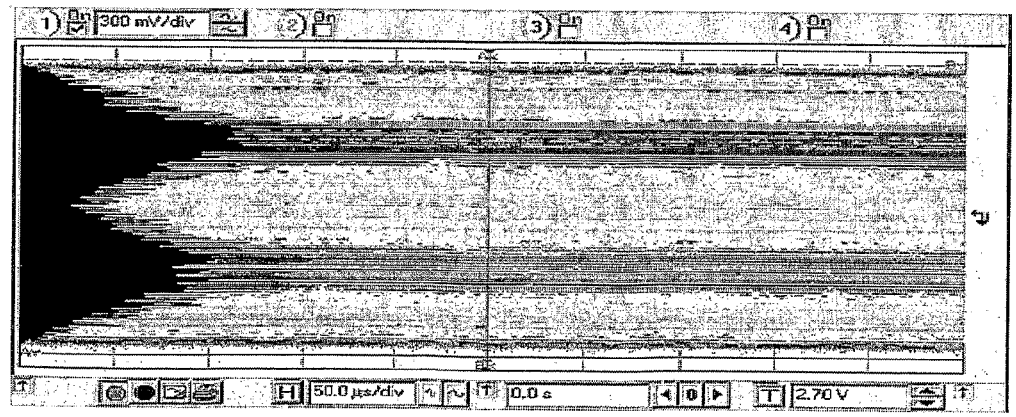

According to the procedure explained in Section 9, we examined the distribution of $v_1$. As a result, distribution of $v_1$ obtained at the rising edge of $v_p(t)$ is shown in FIG. 19.

To be able to determine initial values of the thresholds appropriately, similarly to numerical bit generation, top and bottom distributions were examined. Then, initial values of $V_{top}$ and $V_{bottom}$ were determined as the medians of the top and bottom distributions which were 470 mV and −470 mV, respectively while $V_{middle}$ was determined as 0 mV. Sampling frequency of $v_1$, was determined by dividing the frequency of $v_p(t)$ into pre-scaler value inside the FPGA.

Figure 20:
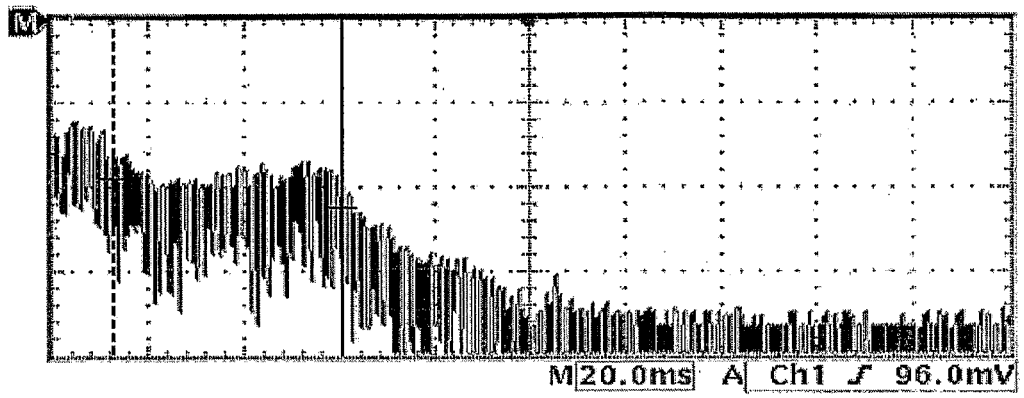

For determining the initial value of the pre-scaler appropriately, the frequency spectrum of $v_1$ given in FIG. 20 was observed. As shown in FIG. 20 chaotic signal $v_1$ has noise-like power spectrum. The center frequency of the chaotic oscillator is indicated by the solid marker set at 7.234 KHz. Up to the dashed marker set at 1.55 KHz. the region in which the power spectrum is flat, chaotic signal $v_1$ contains all frequencies in equal amounts and power spectral density is at its maximum. Hence, without loss of generality, $v_1(t)$ and $v_1(t+t_0)$ can be considered as uncorrelated for all $t_0 \neq 0$ and $v_1$ can be sampled up to 1.55 KHz as a random signal source. Finally, initial value of the pre-scaler was determined as 3, while the frequency of $v_p(t)$ was 4.65 KHz.

Offset compensations of $V_{top}$ and $V_{bottom}$ thresholds were realized by implementing monobit test of FIPS-140-2 test suite for $S_{top}$ and $S_{bottom}$ binary sequences. For each sequence, bit streams of length 20000 Bits were acquired, if the number of 0's>10275 then corresponding threshold was decreased and if the number of 0's≤9725 then corresponding threshold was increased.

Figure 21:
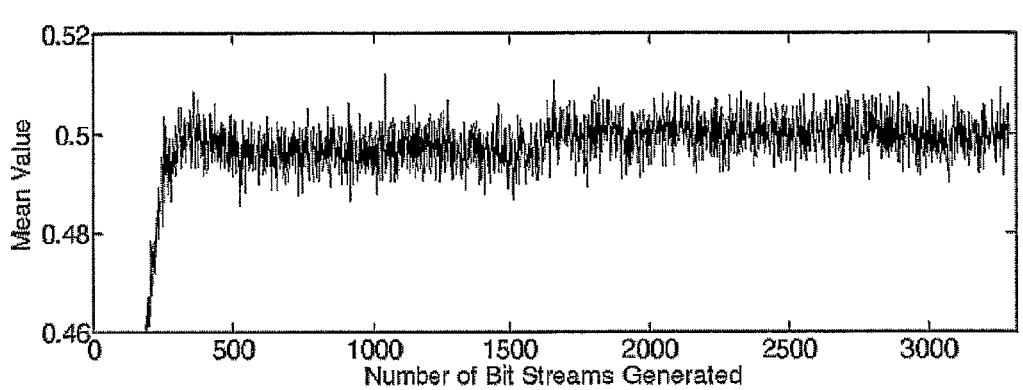

Frequency compensation loop was realized by implementing runs test of FIPS-140-2 test suite for $S_{xor}$ binary sequence. If 3 $S_{xor}$ bit streams of length 20000 Bits which were acquired in sequence failed in runs test, which indicated over sampling of $v_1$, then sampling frequency of $v_1$ was scaled down by increasing the pre-scaler value. Pre-scaler value, initial value of which was determined as 3, became stable at 4. If necessary, sampling frequency can be scaled up externally through the PCI interface. The effect of offset compensation for $V_{top}$, which is similar to one for $V_{bottom}$, is shown in FIG. 21, in spite of the fact that, initial value of the threshold was not adjusted appropriately, mean value of the bit stream of length 20000 Bits reached and became stable at ½ by compensation.

10.4 Test Results

After pre-scaler and threshold values became stable, bit stream of length 223 MBits was acquired and subjected to full NIST test suite. As a result, we have experimentally verified that, bit sequence $S_{xor}$, passed the tests of NIST random number test suite without Von Neumann processing. Results for the uniformity of P-values and the proportion of passing sequences of the Regional RNG circuit are given in Table 2 where P-value (0≤P-value≤1) is a real number estimating the probability that a perfect RNG would have produced a sequence less random than the given sequence. It is reported that, for a sample size of 223×1 MBits the minimum pass rate for each statistical test with the exception of the random excursion (variant) test is approximately 0.970011.

When the center frequency of the chaotic oscillator was 7.234 KHz throughput data rate of $S_{xor}$ effectively becomes $$\left(\frac{4.65 \text{ KHz}/4}{2}\right) 581 \text{ bps,}$$

(Pre-scaler value: 4) because of dividing $v_1$ into two regions according to distribution. Throughput data rate of $S_{xor}$ can be generalized as $$f_{xor} = \frac{581\tau}{\tau_{new}} = \frac{0.012782}{\tau_{new}}$$

where $v_{new} = R_{new} C_{new}$. In [22], a chip realization of the double-scroll system with $R_{new} = 28.5$ KΩ and $C_{new} = 15$ pF has been presented, which leads to a center frequency of operation at $$f = \frac{1}{2\pi\tau_{new}} = 500 \text{ KHz.}$$

Considering that the circuit in [22] was realized on a relatively slow 1.2μ CMOS process, we can deduce that the circuit can easily be integrated on today process at a couple of 10 MHz and can generate throughput closer to Mbps. However, it should be noted that chaotic circuits operating at much higher frequencies are reported in literature. For example, cadence simulation results of a chaotic circuit operating at 5.3 GHz is presented in [18].

TABLE 2

Results of the NIST test suite for Regional RNG.

| STATISTICAL TESTS | $S_{xor}$ Bit Sequence | |
|---|---|---|
| | P-Value | Proportion |
| Frequency | 0.084879 | 0.9955 |
| Block Frequency | 0.020612 | 0.9821 |
| Cumulative Sums | 0.186566 | 0.9955 |
| Runs | 0.392456 | 0.9776 |
| Longest Run | 0.613470 | 0.9821 |
| Rank | 0.298151 | 0.9865 |
| FFT | 0.231847 | 0.9865 |
| Nonperiodic Templates | 0.716974 | 1.0000 |
| Overlapping Templates | 0.053938 | 0.9776 |
| Universal | 0.941144 | 0.9955 |
| Apen | 0.449956 | 0.9821 |
| Random Excursions | 0.725540 | 1.0000 |
| Random Excursions Variant | 0.901761 | 1.0000 |
| Serial | 0.744459 | 0.9955 |
| Linear Complexity | 0.797289 | 0.9865 |

While comparing our Regional RNG design with the previous one given in [15], we have experimentally verified that, for the same chaotic oscillator the throughput data rate of the RNG method given in [15] was 385 bps. Furthermore bit sequence obtained from the RNG method given in [15] can pass the full test suite of Diehard with only Von Neumann processing.

As a result the proposed designs, compensated TRNGs based on an autonomous chaotic oscillator and a double-scroll attractor, are enhanced architectures where offset and frequency compensation loops are added to maximize the statistical quality of the output sequences and to be robust against external interference parameter variations and attacks aimed to force throughput.

11 Truly Random Number Generators Based on a Double-Scroll Attractor

In the proposed TRNG, we have obtained random data from the Poincaré section of the chaotic system and numerically verified that the bit streams generated from the proposed random number generator pass the four basic random number tests of FIPS-140-2 test suite. Moreover, we have also experimentally verified that the binary data obtained from the proposed circuit pass the tests of NIST full random number test suite.

12 Double-Scroll Attractor

The double-scroll attractor which is used as the core of the RNG is obtained from a simple model given in [22], which is expressed by the Equation 15. It should be noted that when the nonlinearity is replaced by a continuous nonlinearity, the system is "qualitatively similar" to Chua's oscillator.

$\dot{x} = y$ $\dot{y} = z$ $\dot{z} = ax - ay - az + sgn(x)$ (15)

Figure 22:
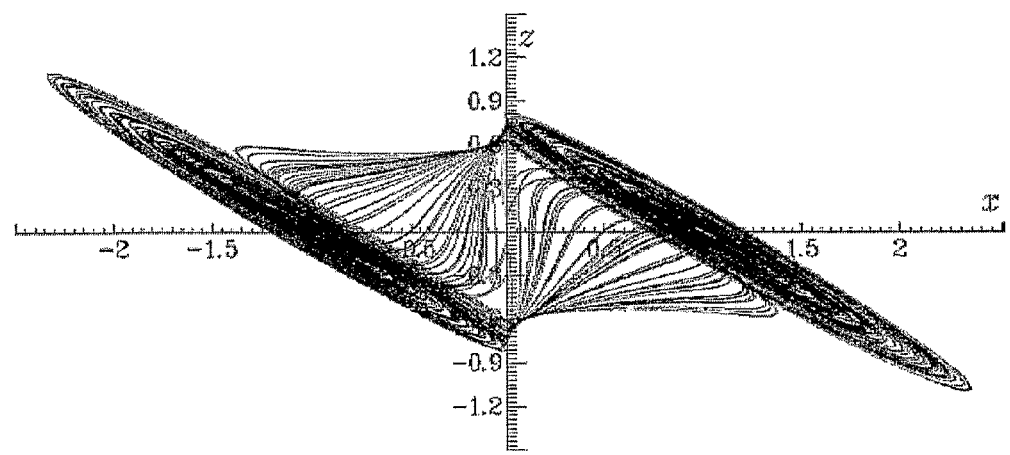

The equations in 15 generate chaos for different set of parameters. For example, the chaotic attractor shown in FIG. 22 is obtained from the numerical analysis of the system with α=0.666 using a $4^{th}$-order Runge-Kutta algorithm with an adaptive step size.

13 RANDOM BIT GENERATION

In order to obtain random binary data from a continuous-time chaotic system, we have presented an interesting technique, which relies on generating a non-invertible binary data from the waveform of the given chaotic system. It should be noted that non-invertibility is a key feature for generating PRNGs.

To obtain binary random bits from the chaotic attractor, we used Poincaré section defined by z(t)=0 of the system in Equation 15. Note that, although 2-dimensional Poincaré section in the x-y plane is invertible, one may obtain a non-invertible section by considering only the values corresponding to one of the states, say x.

Figure 23:
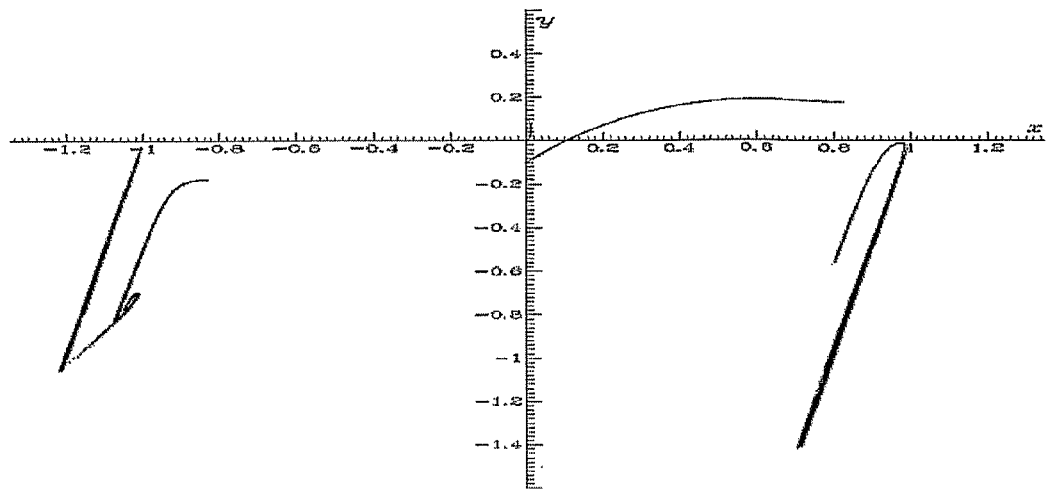
Figure 24:
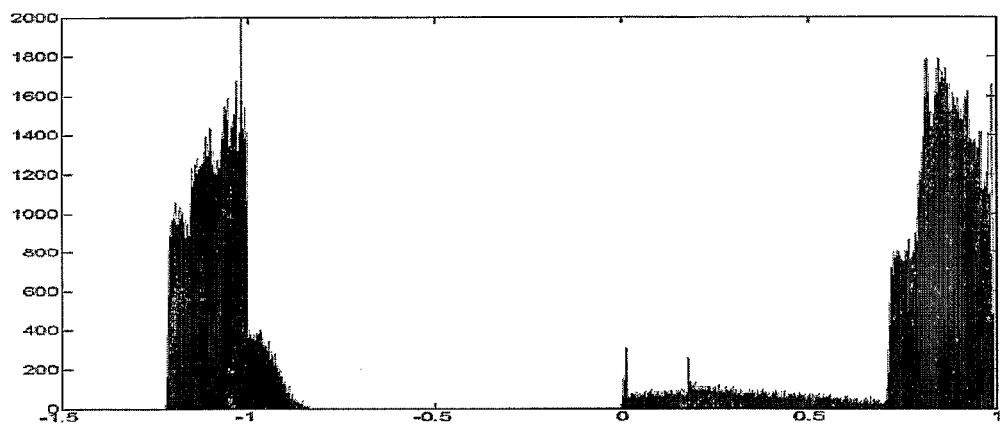

We initially examined the distribution of x values in the Poincaré section defined as $z(t) = z_n$; with $$\frac{dz}{dt} > 0$$

where $z_n$ varies from $z_{min}$ to $z_{max}$ to determine appropriate sections where the distribution looks like random signal. Although, we could not find Poincaré sections of which x values have a single normal or $X^2$ distribution for different values of $z_n$, we determined various Poincaré sections where the distribution of x has at least two regions. For the chaotic system, the values of the state x in the above defined Poincaré section for z(t)=0, and its distribution are shown in FIG. 23 and FIG. 24, respectively.

Distribution of x having two regions, suggests us to generate random binary data from regional x values for regional thresholds. Following this direction, we have generated the binary data $S_{(top)i}$ and $S_{(bottom)i}$ from the Poincaré section. according to the Equation 16:

$$S_{(top)i} = sgn(x_i - q_{top}) \text{ when } x_i \geq q_{middle}$$

$$S_{(bottom)i} = sgn(x_i - q_{bottom}) \text{ when } x_i < q_{middle} \quad (16)$$

where sgn(.) is the signum function, $x_i$'s axe the values of x at the Poincaré section, $q_{top}$ and $q_{bottom}$ are the thresholds for top and bottom distributions, respectively and $q_{middle}$ is the boundary between the distributions. To be able to choose the thresholds appropriately, we examined top and bottom distributions as shown in FIG. 24 and then, $q_{top}$ and $q_{bottom}$ were determined as the medians of the top and bottom distributions which were 0.8158 and −1.0169, respectively when $q_{middle}$ was determined as 0.

Generation of the binary sequence thus obtained does not so much dependent On $q_{middle}$ value, because for this boundary value, distribution density of x is minimum. However, distribution density of x for threshold values ($q_{top}$, $q_{bottom}$) is maximum so the binary sequence obtained may be biased. In order to remove the unknown bias in this sequence, the well-known Von Neumann's de-skewing technique can be employed. This technique consists of converting the bit pair 01 into the output 0, 10 into the output 1 and of discarding bit pairs 00 and 11. However, this technique decreases throughput because of generating approximately 1 bit from 4 bits.

To eliminate the bias, we exploited another method, ⊗ (exclusive-or) operation instead of Von Neumann processing in order not to decrease throughput. The potential problem with the exclusive-or method is that a small amount of correlation between the input bits will add significant bias to the output. We calculated the correlation coefficient of generated binary sequences $S_{top}$ and $S_{bottom}$ of length 32.000 as about 0.00087 and determined that the generated binary sequences are independent. According to this result, we have generated the new binary data $S_{(xor)i}$ by using the given Equation 17:

$$S_{(xor)i} = S_{(top)i} \otimes S_{(bottom)i} \quad (17)$$

The mean value $\psi$ of the binary sequence $S_{xor}$ thus obtained, can be calculated by the given Equation 18:

$$\psi = \frac{1}{2} - 2\left(\mu - \frac{1}{2}\right)\left(\upsilon - \frac{1}{2}\right) \quad (18)$$

where the mean value of $S_{top} = \mu$ and the mean value of $S_{bottom} = \nu$. Thus if $\mu$ and $\nu$ are close to ½ there $\psi$ is very close to ½. As a result, we have numerically verified that the bit sequence $S_{xor}$, which was obtained for the given appropriate threshold values according to procedure given in Equation 17, passed the tests of FIPS-140-2 test suite without Von Neumann processing. We called random number generation according to above procedure, as Regional—RNG.

14 Hardware Realization of RNG

Due to the lack of access to a suitable fabrication facility, we have chosen to construct the proposed circuit using discrete components in order to show the feasibility of the circuit.

Circuit was biased with a ±5V power supply. The circuit diagram realizing the double-scroll attractor is given in FIG. 25. AD844 is used as a high speed operational amplifier and LM211 voltage comparator is used to realize required non-linearity. The passive component values were taken as: $R_1 = R_2 = \alpha R_3 = R = 10$ kΩ, $R_3 = 15$ kΩ for $\alpha = 0.666$, $C_{17} = C_{18} = C_{19} = C = 2.2$ nF, and $R_K = 100$ kΩ.

Figure 26:

Therefore the main frequency of the chaotic oscillator:

$$f = \frac{1}{2\pi\tau}$$

corresponding to time constant $\tau$ where $\tau = RC$, was adjusted to a low frequency value as 7.234 KHz on purpose to provide the circuit not to be affected by parasitic capacitances. The observed attractor is shown in FIG. 26.

14.1 Regional RNG

In Regional RNG, to obtain a non-invertible map only the x variables of the Poincaré section was used. The voltage $v_1$, which corresponds to the variable x, was converted into binary sequences according to the procedure explained in Section 13. In order to implement this procedure, the circuit shown in FIG. 27 as used. In this circuit, the comparators were implemented from LM211 chips and the voltage levels $V_{top}$, $V_{middle}$ and $V_{bottom}$ were used to realize the thresholds in Equation 16, respectively. In implementation Eqn. 16 and Eqn. 17 transforms into:

$$S_{(top)i} = sgn(v_{1i} - V_{top}) \text{ when } v_{1i} \geq V_{middle}$$

$$S_{(bottom)i} = sgn(v_{1i} - V_{bottom}) \text{ when } v_{1i} < V_{middle}$$

$$S_{(xor)i} = S_{(top)i} \otimes S_{(bottom)i} \quad (19)$$

An FPGA based hardware, which has a PCI interface was designed to upload the binary data to the computer. To obtain x values in the Poincaré section defined as z(t)=0 with $$\frac{dz}{dt} > 0,$$

the voltage $v_3$, which corresponds to the variable z was compared with 0V and on the rising edge of this comparator, output bit stream of the other comparators were sampled and stored in binary format. Exclusive-or operation for $S_{xor}$ sequence was implemented inside the FPGA and after exclusive-or operation, the candidate random numbers were uploaded to the computer through the PCI interface. Maximum data storage rate of our FPGA based hardware is 62 Mbps.

Figure 28:
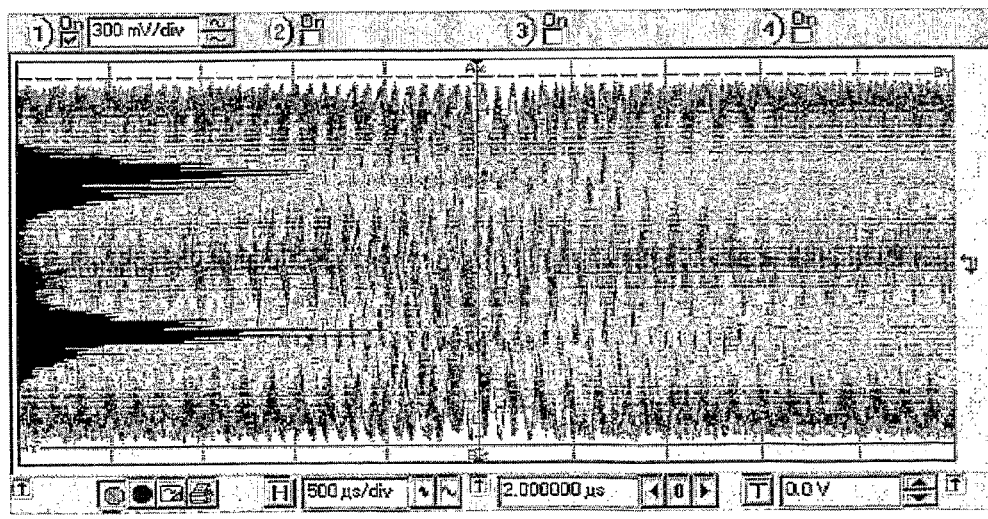

According to the procedure explained in Section 13, we examined the distribution of $v_1$. As a result, an oscilloscope snapshot which shows the distribution of $v_1$ obtained at $v_3(t) = 0$ with $$\frac{dv_3}{dt} > 0$$

is depicted in FIG. 28.

To be able to determine the thresholds appropriately, similarly to numerical bit generation, we examined top and bottom distributions. Then, $V_{top}$ and $V_{bottom}$ were determined as the medians of the top and bottom distributions which were 524 mV and −417 mV, respectively while $V_{middle}$ was determined as 0 mV.

Then, $S_{xor}$ bit stream of length 105 Mbytes was acquired from the regional RNG circuit for the given appropriate threshold values. The obtained bits were subjected to full NIST test suite and faded in Runs, Longest Run and Apen tests. This showed us the over sampling of $v_1$. Then, to improve the results, we obtained a second sequence of bits by implementing a counter inside the FPGA. The output bit stream of $v_1$ comparators are sampled on the second rising edges of $v_3$ comparator.

As a result, we have experimentally verified that, bit sequence $S_{xor}$ generated on the second rising edges, passed the tests of full NIST random number test suite without Von Neumann processing for the given appropriate threshold values with ±2 mV tolerance.

Test results, which correspond to the pass proportions of the Regional RNG circuit are given in Table 3. When the main frequency of the chaotic oscillator is 7.234 KHz throughput data rate of $S_{xor}$, which is generated on the second rising edges, effectively becomes 1820 bps. Throughput data rate of $S_{xor}$ can be generalized as $$f_{xor} = \frac{1820\tau}{\tau_{new}} = \frac{0,04004}{\tau_{new}}$$

where $\tau_{new} = R_{new} C_{new}$. In [22], a chip realization of the double-scroll system with a center frequency of operation at $$f = \frac{1}{2\pi\tau_{new}} = 500 \text{ KHz}$$

has been presented. Considering that the circuit in [22] was realized on a relatively slow 1.2 u CMOS process, we can deduce that the circuit can easily be integrated on today's process at a couple of 10 MHz and can generate throughput in the order of a few Mbps. However, it should be noted that chaotic circuits operating at much higher frequencies are reported in the literature. For instance, cadence simulation results of a chaotic circuit operating at 5.3 GHz is presented in [18].

While comparing our Regional RNG design with the previous one given in [15], we have numerically verified that, the throughput data rate of the RNG method given in [15] was 1634 bits per 100000 unit normalized time while the throughput data rate of regional sequence obtained $S_{xor}$ was 7719 bits per 100000 unit normalized time. Furthermore bit sequence obtained from the RNG method given in [15] can pass the full test suite of Diehard with only Von Neumann processing and the sample bit sequence given at http://www.esat.kuleuven-.ac.be/mey/Ds2RbG/Ds2RbG.html fails in Block-frequency, Runs and Apen tests of full NIST test suite.

TABLE 3

Results of the NIST test suite for Regional RNG.

| STATISTICAL TESTS | $S_{xor}$ Bitsequence |
|---|---|
| The Minimum Pass Rates | 0.9807 |
| Frequency | 0.9819 |
| Block Frequency | 0.9819 |
| Cumulative Sums | 0.9833 |
| Runs | 0.9924 |
| Longest Run | 0.9838 |
| Rank | 0.9914 |
| FFT | 1.0000 |
| Nonperiodic Templates | 0.9844 |
| Overlapping Templates | 0.9838 |
| Universal | 1.0000 |
| Apen | 0.9885 |
| Random Excursions | 1.0000 |
| Random Excursions Variant | 1.0000 |
| Serial | 0.9890 |
| Linear Complexity | 0.9828 |

In conclusion, we have experimentally verified that when the main frequency of the chaotic oscillator is 7.234 KHz and without Von Neumann processing, the throughput data rate of regional sequence, xor output is 1820 bps. Considering that a continuous-time chaotic oscillator with a main frequency of, for instance 40 MHz is used as the core of the proposed RNG in IC, throughput data rates of Regional RNG may be probably increased up to 10 Mbps. In conclusion, we can deduce that the use of continuous-time chaos is very promising in generating random numbers with very high and constant data rates without post-processing.

15 Truly Random Number Generators Based on Continuous-Time Chaos

In spite of the fact that, the use of discrete-tine chaotic maps in the realization of RNG is well-known for some time, it was only recently shown that continuous-time chaotic oscillators can also be used to realize TRNGs. Following up in this direction, we investigated the usefulness of the proposed chaotic oscillators as the core of a RNG.

Although many chaotic oscillators exist in the literature, only a few of them are designed concerning high-performance IC design issues, such as low power consumption, high-frequency operation, operation capability at low voltage levels. In this work, we present simple non-autonomous chaotic oscillators, which are suitable for high performance IC realization.

Initially, we have obtained random data from the 1-dimensional stroboscopic Poincaré map of the proposed chaotic systems and numerically verified that, when the map was divided into regions according to distribution, the bit streams generated by the RNG built around the proposed circuits passed the four basic random number tests of FIPS-140-2 test suite. Moreover, we have also experimentally verified that the binary data obtained from the chaotic circuits passed the tests of NIST full random number test suite.

16 Proposed Oscillators

Figure 29:
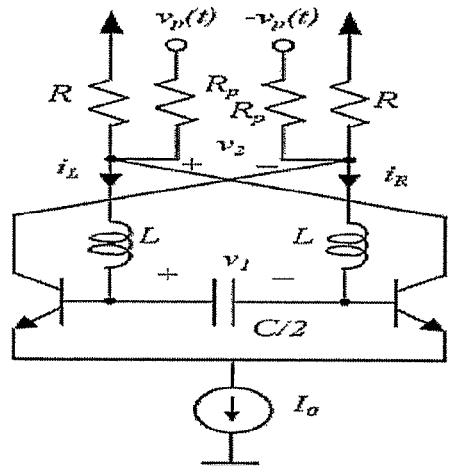

The proposed bipolar chaotic oscillator is presented in FIG. 29. Assuming that the parasitic capacitances appearing between the collectors of the bipolar transistors and the ground axe denoted by $C_p$, routine analysis of the circuit yields the following state equations.

$$Cv_1^* = -i_3 \qquad (20)$$

$$Li_3^* = (v_1 - v_2)$$

$$C_p v_2^* = i_3 - \left(\frac{1}{R} + \frac{1}{R_p}\right)v_2 + \frac{2}{R_p}V_p \text{sgn}(\sin\Omega t) + I_0 \tanh\left(\frac{v_1}{2V_T}\right)$$

where $i_3 = i_R - i_L$ and $v_p(t)$ is the external periodical pulse train defined as $v_p(t) = \text{syn}(\sin \Omega t)$ and $V_T$ is the thermal voltage ($V_T = kT/q$), which is equal to 25.8 mV at room temperature.

Using the normalized quantities: $R_0 \equiv \sqrt{L/C}$, $x = v_1/V_s$, $y = i_3 R_0/V_s$, $z = v_2/V_s$, $c_0 = I_0 R_0/V_s$, $\alpha = R_0/R_p$, $\beta = R_0/R$, $\omega \equiv \Omega \sqrt{LC}$ and taking $V_p = 0.5 V_s = V_T$ and $t_n = t/RC$, where $V_S$ is an arbitrary scaling voltage, the equations of the system in Eqn. 20 transforms into:

$$\dot{x} = -y$$

$$\dot{y} = x - z$$

$$\epsilon\dot{z} = y - (\alpha + \beta)z + \alpha \text{sgn}(\sin \omega t) + c_0 \tan h(x) \qquad (21)$$

Figure 30:
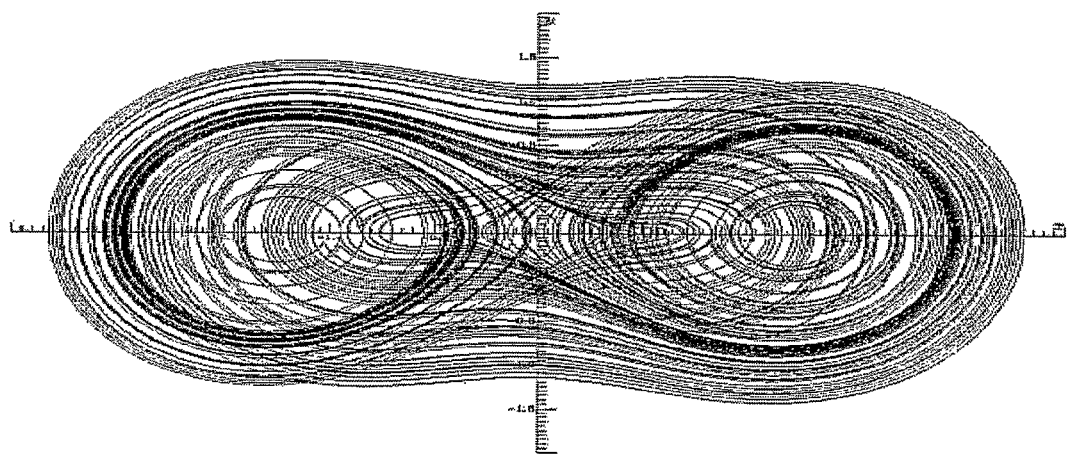

The equations in 21 generate chaos for different set of parameters. For example, the chaotic attractor shown in FIG. 30 is obtained from the numerical analysis of the system with $c_0=25$, $\alpha=4$, $\beta=12$, $\omega=0.27$, $\epsilon=0.3$ using a $4^{th}$-order Runge-Kutta algorithm with an adaptive step size.

Figure 31:
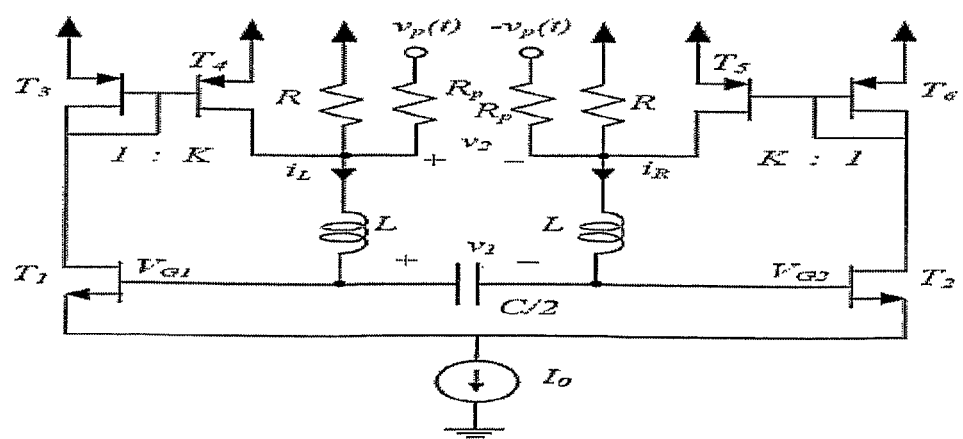

The proposed CMOS chaotic oscillator is presented in FIG. 31. $T_3$-$T_4$ and $T_5$-$T_6$ transistor pairs are used to implement simple current mirrors, where the current ratios of the mirrors are denoted by K. Assuming that the parasitic capacitances appearing between the gates of $T_1$-$T_2$ transistor pairs and the ground are denoted by $C_p$, routine analysis of the circuit yields the following Eqn. 22:

$$Cv_1^* = -i_3$$
$$Li_3^* = (v_1 - v_2)$$
$$C_p v_2^* = i_3 - \left(\frac{1}{R} + \frac{1}{R_p}\right)v_2 + \frac{2}{R_p}V_p\text{sgn}(\sin\Omega t) + K \quad (22)$$

$$\begin{cases} I_0 & \text{if } V_{G1} - V_{G2} \geq \sqrt{2}\,V_{sat} \\ g_m(V_{G1} - V_{G2})\sqrt{1 - \left(\frac{V_{G1}-V_{G2}}{2V_{sat}}\right)^2} & \text{if } \sqrt{2}\,V_{sat} > V_{G1} - V_{G2} \geq -\sqrt{2}\,V_{sat} \\ -I_0 & \text{if } V_{G1} - V_{G2} < -\sqrt{2}\,V_{sat} \end{cases}$$

where $i_3=i_R-i_L$, $v_p(t)=\text{sgn}(\sin\Omega t)$ $$g_m = \sqrt{\mu_n C_{ox} \frac{W}{L} I_0},$$

$$V_{sat} = \sqrt{\frac{I_0}{\mu_n C_{ox}, \frac{W}{L}}}$$

and $\frac{W}{L}$ is the width-length ration of $T_1$-$T_2$ transistor pairs.

Using the normalized quantities: $R_0=\sqrt{L/C}$, $x=V_{G1}/V_s$, $y=i_3 R_0/V_s$, $z=v_{G2}/V_s$, $c_0=2I_0 R_0/V_s$, $\alpha=R_0/R_p$, $\beta=R_0/R$, $b_0\beta V_s/2$, $\omega=\Omega\sqrt{LC}$ and taking $V_p=0.5V_s$ and $t_n=t/RC$, where $V_s$ is an arbitrary scaling voltage, the equations of the system in Eqn. 22 transforms into:

$$\dot{x} = -y \quad (23)$$
$$\dot{y} = x - z$$
$$\epsilon \dot{z} = y - (\alpha + \beta)z + \alpha\text{sgn}(\sin\omega t) +$$

$$K \begin{cases} 0.5c_0 & \text{if } x \geq \sqrt{\frac{c_0}{2b_0}} \\ b_0 x \sqrt{\frac{c_0}{b_0} - x^2} & \text{if } \sqrt{\frac{c_0}{2b_0}} > x \geq -\sqrt{\frac{c_0}{2b_0}} \\ -0.5c_0 & \text{if } x < -\sqrt{\frac{c_0}{2b_0}} \end{cases}$$

Figure 32:
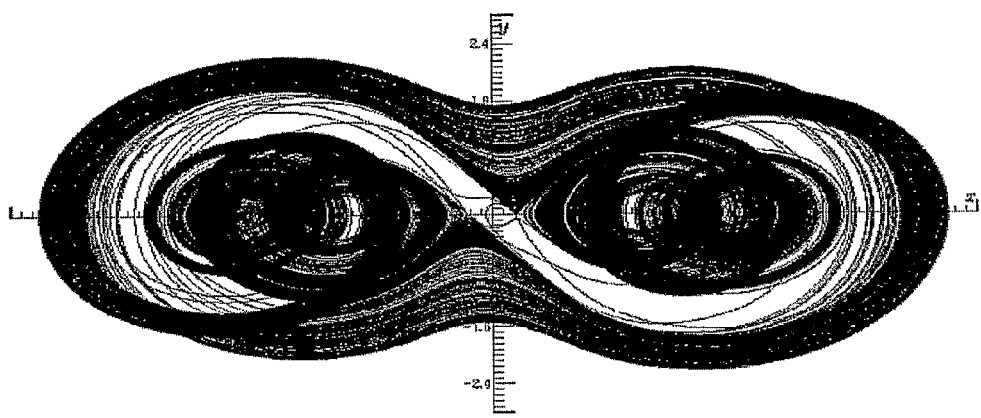

The equations in 23 generate chaos for different set of parameters. For example, the chaotic attractor shown in FIG. 32 is obtained from the numerical analysis of the system with $c_0=1.5$, $\alpha=2.67$, $\beta=3.38$, $\omega=0.33$, $b_0=0.9$, $\epsilon=0.1$ using a $4^{th}$ order Runge-Kutta algorithm with an adaptive step size.

Proposed chaotic oscillators offer some considerable advantages over the existing oscillators. Both of the circuits employ a differential pair to realize the required nonlinearity, which is the most widely used basic analog building block due to its high IC performance. The resistors employed in the circuits have very small values, so they can be effectively realized on IC. Moreover, the proposed chaotic oscillators are balanced; hence they offer better power supply rejection and noise immunity. Finally, the external source used to drive the circuits is a periodical pulse train, which can be accurately and easily realized using the clock signal already available on chip.

17 Mechanism of Chaos Generation

It is known that Melnikov's conditions can be used to show the existence of horseshoes in nearly Hamiltonian forced planar dissipative systems. According to the Smale-Birkhoff Theorem, for a given planar perturbed nonlinear system of the form, $\dot{x}=f(x)+\mu g(x,t)$, where f and g are smooth functions and g is periodic in time with a period of $T_\gamma$, if the following conditions are satisfied:

1. For $\mu=0$ the system is Hamiltonian and has a homoclinic orbit passing through the saddle-type critical point,
2. For $\mu=0$, the system has one parameter family of periodic orbits $\theta_\gamma(t)$ of period $T_\gamma$ on the interior of the homoclinic orbit with, $\Delta\theta_\gamma(0)/\Delta\gamma \neq 0$,
3. For $t_0 \in [0,T]$ The Melnikov function $$M(t_0) = \int_{-\infty}^{+\infty} f^0(\tau) \wedge g^0(\tau + t_0) d\tau$$

has simple zeros, then the system has chaotic motions and horseshoes.

Figure 33:
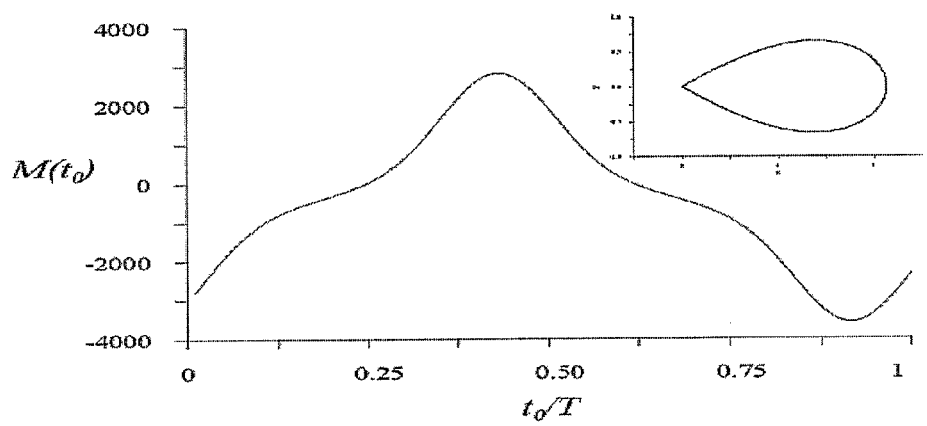

It is easy to verify that for $\epsilon=0$ (the parasitic capacitances are neglected), the system in Eqn. 21 can be written as follows:

$$\begin{bmatrix} \dot{x} \\ \dot{y} \end{bmatrix} = \begin{bmatrix} -y \\ x - \alpha\tanh x \end{bmatrix} + \mu \begin{bmatrix} 0 \\ -y - \alpha x_p(t) \end{bmatrix} \quad (24)$$

where $x_p(t)=\text{sgn}(\sin(\omega t))$, $\alpha=c_0/(\alpha+\beta)$ and $\mu=1/(\alpha+\beta)$. In this case, one can easily verify that the unperturbed system obtained for $\mu=0$ has a saddle type critical point at the origin for $\alpha>1$. Also, the unperturbed system is Hamiltonian and has an homoclinic orbit passing through the critical point. After replacing the non-smooth function $x_p(t)=\text{sgn}(\sin(\omega t))$ with its smooth approximation $x_p(t) = \tan h(10 \sin(\omega t))$, we have numerically calculated the Melnikov Function given in Equation 25:

$$M(t_0) = \int_{-\infty}^{+\infty} -y^0(y^0 + \alpha x_p(t+t_0))d\tau \qquad (25)$$

on the homoclinic orbit of Equation 24 shown in the upper right corner of FIG. 33. As shown in FIG. 33, we have verified that the Melnikov Function has simple zeros for $t_0 \in [0,T]$ and the system in Equation 24 has chaotic motions and horseshoes. Numerical analysis of the system shows that the system remains chaotic for nonzero and small $\epsilon$ values. For example, the largest Lyapunov exponent of the system is found as 0.9 for $\epsilon = 0.27$.

18 Random Bit Generation

In order to obtain random binary data from an autonomous chaotic system an interesting technique has been presented, which relies on generating a non-invertible binary data from the waveform of the given chaotic system. It should be noted that non-invertibility is a key feature for generating PRNGs.

To obtain binary random bits from the proposed chaotic attractors, we used the stroboscopic Poincaré maps of the chaotic systems of Equation 21 and 23. Note that, although 2-dimensional Poincaré section in the x-y plane is invertible, one may obtain a non-invertible map by considering only the values corresponding to one of the states, say x.

Figure 34:
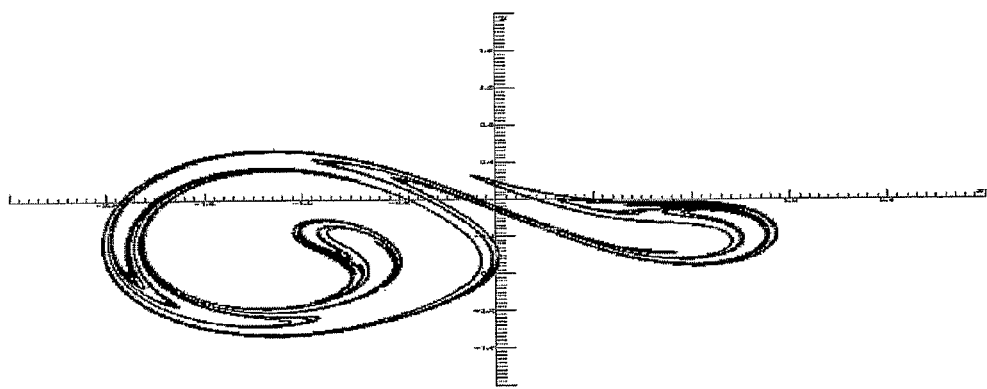
Figure 35:
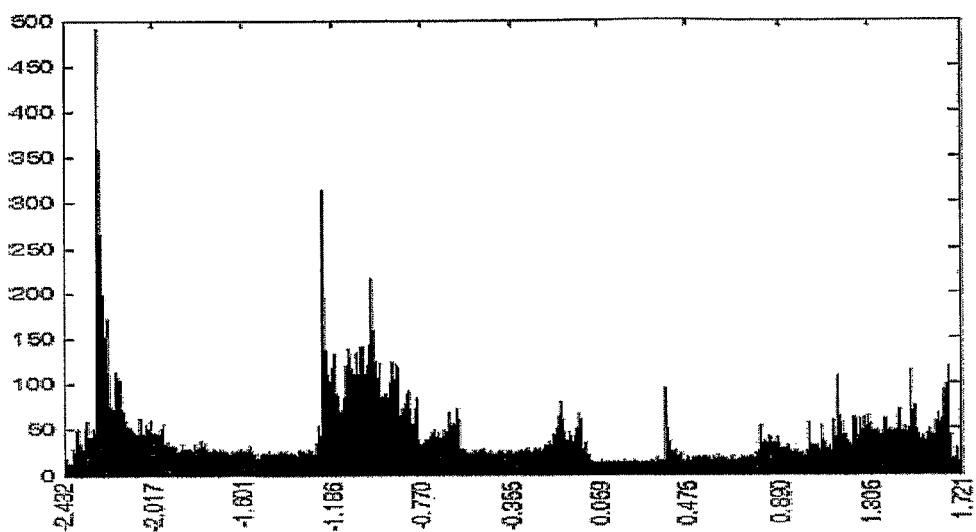
Figure 36:
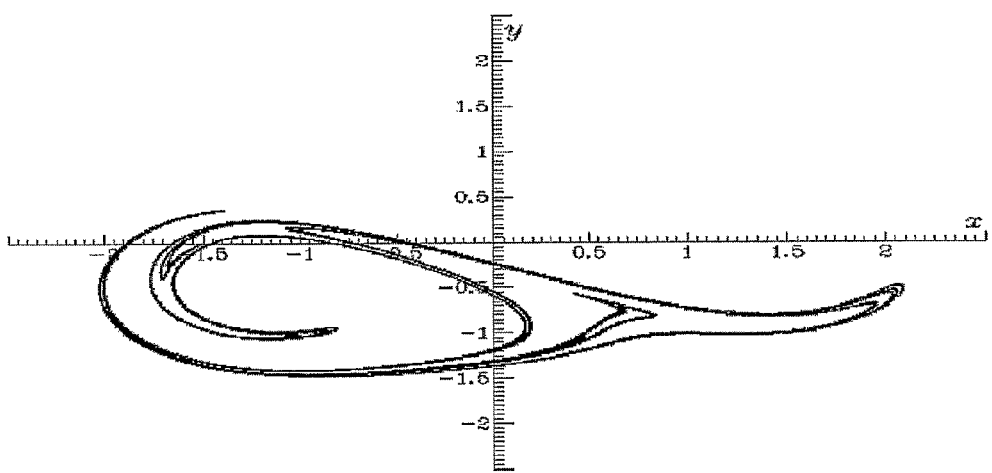
Figure 37:
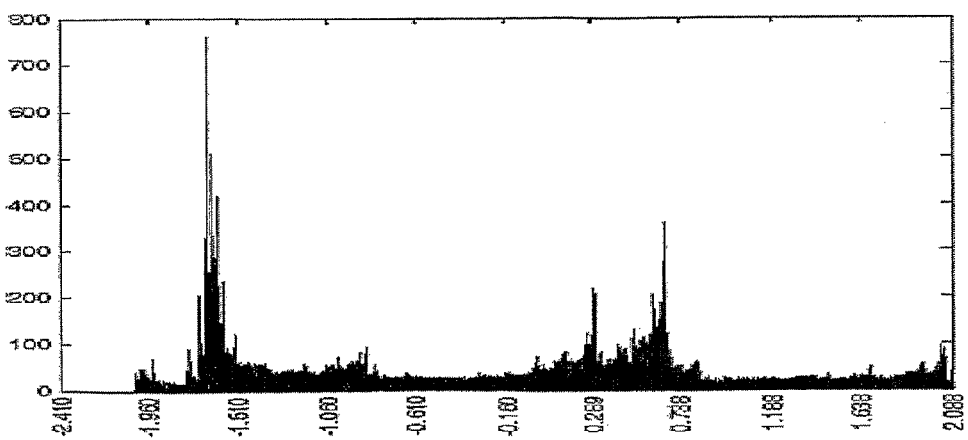

We initially examined the distribution of x values in the Poincaré map along one period of the external periodical pulse signal to determine appropriate maps where the distributions look like random signals. Although, we could not find maps of which x values has a single normal or $\chi^2$ distribution, we determined appropriate Poincaré sections where the distribution of x has at least two regions. For the bipolar system, Poincaré map for $\omega t \bmod 2\pi = 0.30$ and the corresponding distribution are shown in FIG. 34 and FIG. 35, respectively. Similar to bipolar system, Poincaré map for $\omega t \bmod 2\pi = 0.5$, and the corresponding distribution are shown in FIG. 36 and FIG. 37, respectively for the CMOS system.

Distribution of x having two regions, suggests us to generate random binary data from regional x values for regional thresholds. Following this direction, we have generated the binary data $S_{(top)i}$ and $S_{(bottom)i}$ from the Poincaré section according to the Equation 26:

$S_{(top)i} = sgn(v_i - q_{top})$ when $x_i \geq q_{middle}$ $S_{(bottom)i} = sgn(x_i - q_{bottom})$ when $x_i < q_{middle}$ \qquad (26)

where sgn(.) is the signum function, $x_i$'s are the values of x at the Poincaré section, $q_{top}$ and $q_{bottom}$ are the thresholds for top and bottom distributions, respectively and $q_{middle}$ is the boundary between the distributions. To be able to choose the thresholds appropriately, we examined top and bottom distributions as shown in FIG. 35 and FIG. 37. Then, for the bipolar system $q_{top}$ and $q_{bottom}$ were determined as the medians of the top and bottom distributions which were −0.593 and −2.183, respectively when $q_{middle}$ was determined as −1.394. Similar to bipolar system, for the CMOS system $q_{top}$ and $q_{bottom}$ were determined as the medians of the top and bottom distributions which were 0.549 and −1.576, respectively when $q_{middle}$ was determined as −0.610.

Generation of the binary sequence thus obtained does not so much dependent on $q_{middle}$ values, because for these boundary values, distribution density of x is minimum. However, distribution density of x for threshold values ($q_{top}$, $q_{bottom}$) is maximum so the binary sequence obtained may be biased. In order to remove the unknown bias in this sequence, the well-known Von Neumann's de-skewing technique is employed. This technique consists of converting the bit pair 01 into the output 0, 10 into the output 1 and of discarding bit pairs 00 and 11.

Using the above procedure, bit sequences ($S_{top}$, $S_{bottom}$) of length 240.000 have been obtained for both bipolar and CMOS systems and subjected to the four tests (monobit poker, runs and long run) in the FIPS-140-2 test suite. We have verified that the bit sequences passed these tests for the given threshold values with ±0.03 tolerance.

To eliminate the bias, we also exploited another method, $\otimes$ (exclusive-or) operation instead of Von Neumann processing. The potential problem with the exclusive-or method is that a small amount of correlation between the input bits will add significant bias to the output. We calculated the correlation coefficient of generated binary sequences $S_{top}$ and $S_{bottom}$ of length 32.000, as about 0.00011 and determined that the generated binary sequences are independent. According to this result, we have generated the new binary data $S_{(xor)i}$ by using the given Equation 27:

$S_{(xor)i} = S_{(top)i} \otimes S_{(bottom)i}$ \qquad (27)

The mean value $\psi$ of the binary sequence $S_{xor}$ thus obtained, can be calculated by the given Equation 28:

$$\psi = \frac{1}{2} - 2\left(\mu - \frac{1}{2}\right)\left(v - \frac{1}{2}\right) \qquad (28)$$

where the mean value of $S_{top} = \mu$ and the mean value of $S_{bottom} = v$. Thus if $\mu$ and $v$ are close to $\frac{1}{2}$ then $\psi$ is very close to $\frac{1}{2}$. As a result, we have numerically verified that for both bipolar and CMOS systems, the bit sequences $S_{xor}$'s, which were obtained for the given appropriate threshold values according to procedure given in Equation 27, passed the tests of FIPS-140-2 test suite without Von Neumann processing. We called random number ($S_{top}$, $S_{bottom}$, $S_{xor}$) generation according to above procedure, as Regional—RNG.

19 Experimental Verification

Due to the lack of access to a suitable fabrication facility, we have chosen to construct the proposed chaotic oscillator circuits using discrete components in order to show the feasibility of the circuits. Both of the bipolar and CMOS circuits were biased with a single 5V power supply and the external signal $v_p(t)$ was generated by a square-wave generator.

The passive component values of the bipolar oscillator were: L=10 mH, C=10 nF, R=180Ω, $R_p$=120Ω and $I_0$=1.2 mA. In FIG. 29, the bipolar transistors and the current source denoted by $I_0$, which was realized using a simple current mirror, were implemented with CA3046 and CA3096 NPN and PNP transistor arrays. Amplitude of $v_p(t)$ was 26 mV. We have experimentally verified that the proposed bipolar circuit had chaotic motions for the following frequency values of $v_p(t)$ (5.95 KHz, 6.23 KHz, 7.12 KHz, 13.03 KHz, 14.48 KHz, 14.91 KHz, 17.07 KHz, 17.23 KHz, 18.08 KHz).

The passive component values of the CMOS oscillator were: L=10 mH, C=10 nF, R=340Ω, $R_p$=430Ω and $I_0$=0.5 mA. In FIG. 31, the CMOS transistors and the current source denoted by $I_0$, which was realized using a simple current mirror, were implemented with LM4007 CMOS transistor arrays. Amplitude of $v_p(t)$ was 383 mV. We have experimentally verified that the proposed CMOS circuit had chaotic motions for the following frequency values of $v_p(t)$ (5.95 KHz, 10 KHz, 11.1 KHz, 12.6 KHz).

Figure 38:
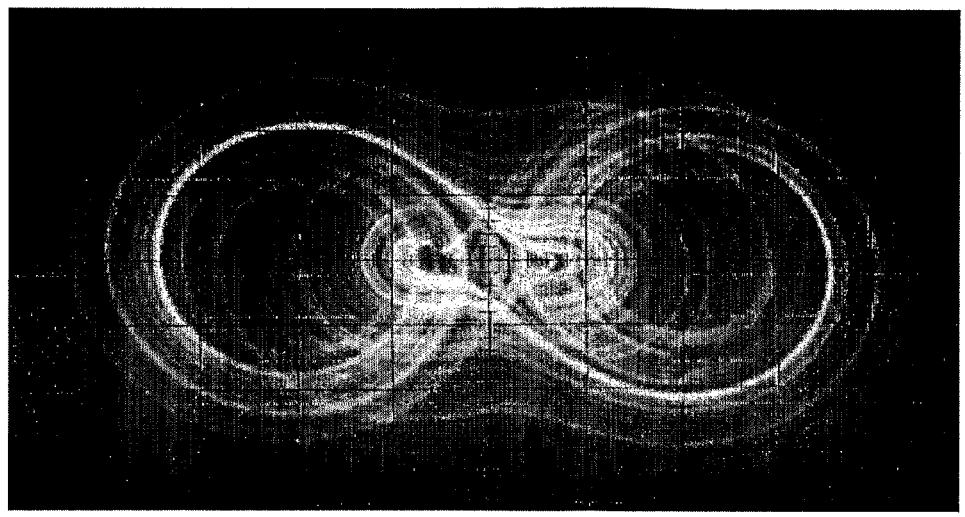
Figure 39:
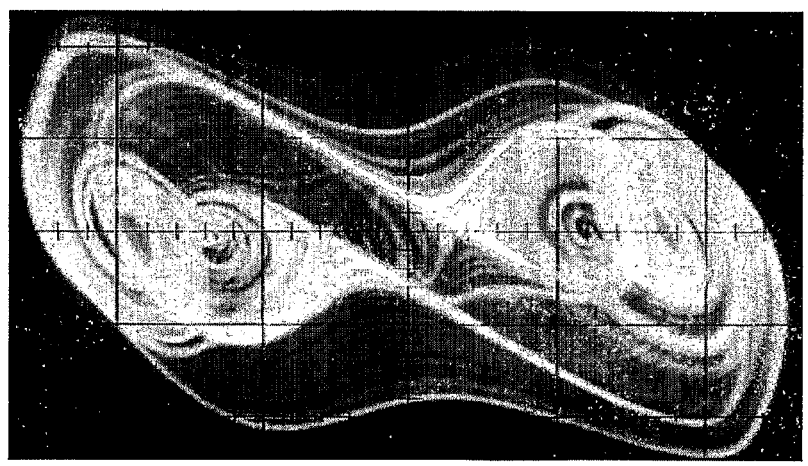

For both bipolar and CMOS oscillators, the frequency of $v_p(t)$ was adjusted to a low frequency value as 5.95 KHz on purpose to provide the circuits not to be affected by parasitic capacitances. The observed attractors are shown in FIG. 38 and FIG. 39 for the bipolar and CMOS oscillators, respectively.

20 Hardware Realization of RNGS

We have generated random bits regionally from the stroboscopic Poincaré maps of the proposed chaotic oscillators.

20.1 Regional RNG

In Regional RNG, to obtain a non-invertible map only the x variables of the Poincaré section was used. The voltage $v_1$, which corresponds to the variable x, was converted into binary sequences according to the procedure explained in Section 18. In order to implement this procedure, the circuit shown in FIG. 40 was used. In this circuit, the comparators were implemented from LM311 chips and the voltage levels $V_{top}$, $V_{middle}$ and $V_{bottom}$ were used to realize the thresholds in Equation 26 respectively. In implementation Eqn. 26 and Eqn. 27 transforms into:

$$S_{(top)i} = sgn(v_{1i} - V_{top}) \text{ when } v_{1i} \geq V_{middle}$$

$$S_{(bottom)i} = sgn(v_{1i} - V_{bottom}) \text{ when } v_{1i} < V_{middle}$$

$$S_{(xor)i} = S_{(top)i} \otimes S_{(bottom)i} \quad (29)$$

An FPGA based hardware, which has a PCI interface was designed to upload the binary data to the computer. At an adjusted time inside a period of the external periodical pulse train, $v_p(t)$, output bit stream of the comparators was sampled and stored in binary format. Von Neumann processing for $S_{top}$ and $S_{bottom}$ sequences and (exclusive-or) operation for $s_{xor}$ sequence were also implemented inside the FPGA. After Von Neumann processing and (exclusive-or) operation, the candidate random numbers were uploaded to the computer through the PCI interface. Maximum data storage rate of our FPGA based hardware is 62 Mbps.

Figure 41:
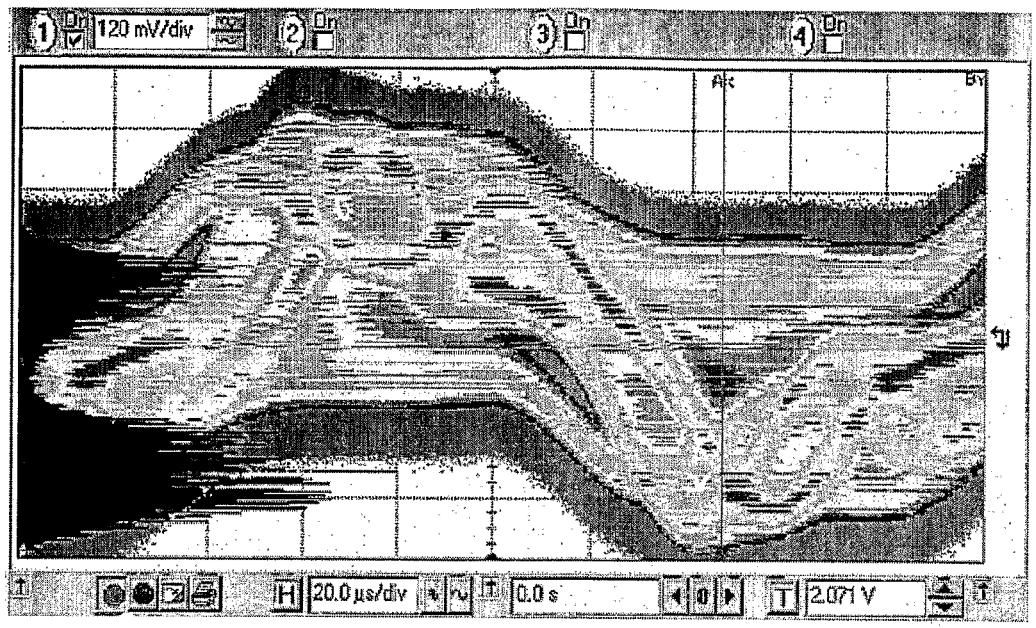
Figure 42:
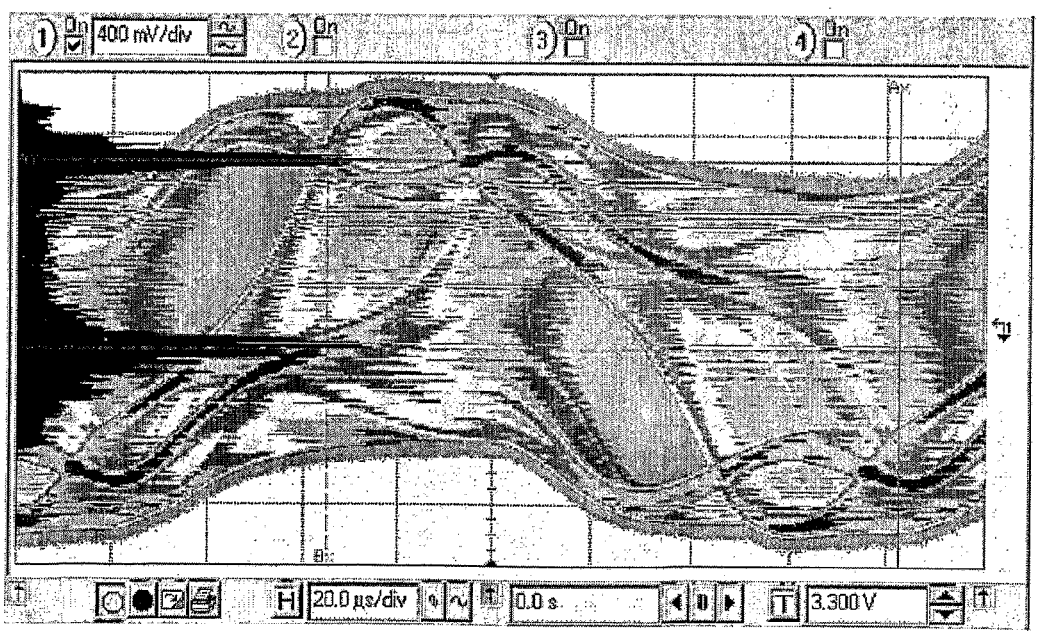

According to the procedure explained in Section 18, we examined the distribution of $v_1$ along one period of $v_p(t)$. As a result, for the bipolar circuit, distribution of $v_1$ obtained 46 µsec after the rising edges of $v_p(t)$ and for the CMOS circuit, distribution of $v_1$ obtained 35 µsec before the rising edges of $v_p(t)$ are shown in FIG. 41 and FIG. 42, respectively.

To be able to determine the thresholds appropriately similarly to numerical bit generation, we examined top and bottom distributions of bipolar and CMOS circuits. Then, for the bipolar circuit $V_{top}$ and $V_{bottom}$ were determined as the medians of the top and bottom distributions which were 103 mV and −287 mV, respectively while $V_{middle}$ was determined as −107 mV. Similar to bipolar circuit, for the CMOS circuit $V_{top}$ and $V_{bottom}$ were determined as the medians of the top and bottom distributions which were 999 mV and −217 mV, respectively while $V_{middle}$ was determined as 560 mV.

Then $S_{top}$, $S_{bottom}$ and $S_{xor}$ bit streams of length 2 GBytes were acquired from both bipolar and CMOS chaotic circuits for the given appropriate threshold values. The obtained bits were subjected to full NIST test suite. As a result, we have experimentally verified that bit sequences $S_{top}$ and $S_{bottom}$ thus obtained passed the tests of full NIST test suite after Von Neumann processing and that bit sequence $S_{xor}$ generated $S_{top}$ and $S_{bottom}$ passed the tests of full NIST random number test suite without Von Neumann processing. Test results, which correspond to the pass rates of the CMOS chaotic circuit are given in the Table 4.

Assuming that, top and bottom distributions have approximately the same density, bit rates of $S_{top}$ and $S_{bottom}$ are equal to the half of external periodical pulse train. As explained in Section 18, Von Neumann processing generates approximately 1 bit from 4 bits. When the frequency of $v_p(t)$ is 5.95 KHz, throughput data rates of $S_{top}$ and $S_{bottom}$ reduce to $$\left(\frac{5.95 \text{ KHz}/2}{4}\right) 743 \text{ bps,}$$

where the throughput data rate of $S_{xor}$ effectively becomes $$\left(\frac{5.95 \text{ KHz}}{2}\right) 2975 \text{ bps.}$$

As a result Bipolar & CMOS, two novel continuous-time chaotic oscillators suitable for IC realization and novel TRNGs based on these oscillators were presented. Numerical and experimental results presented in this section not only verify the feasibility of the proposed circuits, but also encourage their use as the core of a high-performance IC TRNG as well. In conclusion, we have experimentally verified that, when the frequency of the external periodical pulse signal is adjusted to 5.95 KHz, the throughput data rates of regional sequences and Xor output are 743 bps after Von Neumann processing and 2975 bps without Von Neumann processing, respectively.

TABLE 4

Results of the NIST test suite for Regional RNG using CMOS chaotic oscillator alone.

| STATISTICAL TESTS | Bitsequences | | |
| --- | --- | --- | --- |
|  | $S_{top}$ | $S_{bottom}$ | $S_{xor}$ |
| Frequency | 0.9957 | 1.0000 | 0.9881 |
| Block Frequency | 0.9829 | 0.9831 | 0.9890 |
| Cumulative Sums | 0.9957 | 1.0000 | 0.9885 |
| Runs | 0.9573 | 0.9718 | 0.9919 |
| Longest Run | 0.9829 | 0.9831 | 0.9847 |
| Rank | 0.9915 | 0.9774 | 0.9909 |
| FFT | 1.0000 | 1.0000 | 0.9995 |
| Nonperiodic Templates | 0.9846 | 0.9845 | 0.9852 |
| Overlapping Templates | 0.9915 | 0.9944 | 0.9847 |
| Universal | 1.0000 | 1.0000 | 1.0000 |
| Apen | 0.9444 | 0.9322 | 0.9840 |
| Random Excursions | 0.9925 | 0.9877 | 1.0000 |
| Random Excursions Variant | 0.9856 | 0.9869 | 1.0000 |
| Serial | 0.9893 | 0.9915 | 0.9897 |
| Lempel Ziv | 1.0000 | 1.0000 | 1.0000 |
| Linear Complexity | 1.0000 | 0.9718 | 0.9785 |

REFERENCES

1. Jun, B., Kocher P.: The Intel Random Number Generator. Cryptography Research, Inc. white paper prepared for Inter Corp. http://www.cryptography.com/resources/whitepapers/IntelRNG.pdf (1999)
2. Menezes, A. Oorschott, P. van, Vanstone, S: Handbook of Applied Cryptology. CRC Press (1996)
3. Schrift, A. W. Shamir, A.: On the Universality of the Next Bit Test. Proceeding of the CRYPTO. (1990) 394-408.
4. Schneier, B.: Applied Cryptography. $2^{nd}$ edn. John Wiley & Sons (1996)
5. Holman, W. T., Connelly, J. A., Downlatabadi, A. B.: An Integrated Analog-Digital Random Noise Source. IEEE Trans. Circuits and Systems I, Vol. 44. 6 (1997) 521-528
6. Bagini, V. Bucci, M.: A Design of Reliable The Random Number Generator for Cryptographic Applications. Proc.

Workshop Cryptographic Hardware and Embedded Systems (CHES). (1999) 204-218
7. Dichtl, M. Janssen, N.: A High Quality Physical Random Number Generator. Proc. Sophia Antipolis Forum Microelectronics (SAME). (2000) 48-53
8. Petrie, C. S., Connelly, J. A.: A Noise-Based IC Random Number Generator for Applications in Cryptography. IEEE Trans. Circuits and Systems I, Vol. 47. 5 (2000) 615-621
9. Bucci, M., Germani, L., Luzzi, R., Trifletti, A., Varanonuovo, M.: A High Speed Oscillator-based Truly Random Number Source for Cryptographic Applications on a SmartCard IC. IEEE Trans. Comput., Vol. 52. (2003) 403-409
10. Stojanovski, T., Kocarev, L.: Chaos-Based Random Number Generators-Part I: Analysis. IEEE Trans. Circuits and Systems I, Vol. 48, 3 (2001) 281-288
11. Stojanovski, T., Pihl, J., Kocarev, L.: Chaos-Based Random Number Generators-Part II: Practical Realization. IEEE Trans. Circuits and Systems I, Vol. 48, 3 (2001) 382-385
12. Delgado-Restituto, M., Medeiro, F., Rodriguez-Vazquez, A.: Nonlinear Switched-current CMOS IC for Random Signal Generation. Electronics Letters, Vol. 29(25). (1993) 2190-2191
13. Callegari, S., Rovatti, R., Setti, G.: Embeddable ADC-Based True Random Number Generator for Cryptographic Applications Exploiting Nonlinear Signal Processing and Chaos. IEEE Transactions on Signal Processing, Vol. 53, 2 (2005) 793-805
14. Callegari, S., Rovatti, R., Setti, G.: First Direct Implementation of a True Random Source on Programmable Hardware. International Journal of Circuit Theory and Applications, Vol. 33 (2005) 1-16
15. Yalcin, M. E., Suykens, J. A. K., Vandewalle, J.: True Random Bit Generation from a Double Scroll Attractor. IEEE Transactions on Circuits and Systems I: Fundamental Theory and Applications, Vol. 51(7). (2004) 1395-1404
16. National Institute of Standard and Technology. FIPS PUB 140-2 Security Requirements for Cryptographic Modules. NIST, Gaithersburg, Md. 20899, (2001)
17. National Institute of Standard and Technology.: A Statistical Test Suite for Random and Pseudo Random Number Generators for Cryptographic Applications. NIST 800-22, http://csrc.nist.gov/rng/SP800-22b.pdf (2001)
18. Özoğuz, S., Ates, Ö., Elwakil, A. S.: An integrated circuit chaotic oscillator and its application for high speed random bit generation. Proceeding of the International Symposium on Circuit and Systems (ISCAS). (2005) 4345-4348
19. Shamir, A.: On The Generation of Cryptographically Strong Pseudorandom Sequences. ACM Transactions on Computer systems, Vol. 1. (1983) 38-44
20. Von Neumann, J.: Various Techniques Used in Connection With Random Digits. Applied Math Series—Notes by G. E. Forsythe, In National Bureau of Standards, Vol. 12. (1951) 36-38
21. Young L.: Entropy, Lyapunov exponents and Hausdorff dimension in differentiable dynamical systems. IEEE Trans. Circuits Syst. I Vol. 30. (1983) 59-607
22. Elwakil, A. S., Salama, K. N. and Kennedy M. P.: An equation for generating chaos and its monolithic implementation. Int. J. Bifurcation Chaos, Vol. 12, no. 12, (2002) 2885-2896

EXPLANATORY NOTES OF FIGURES

Figure 6:
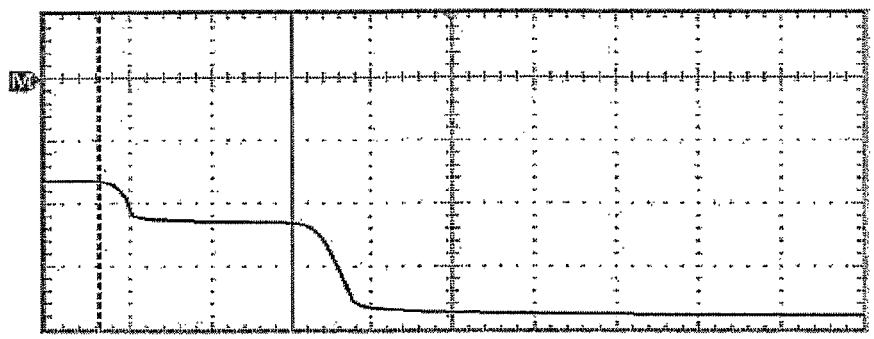
Figure 13:
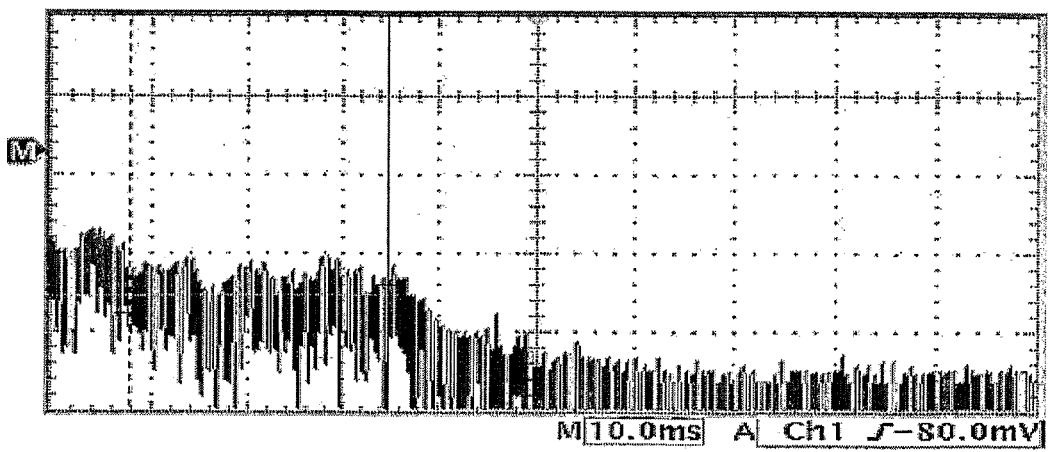
Figure 18:
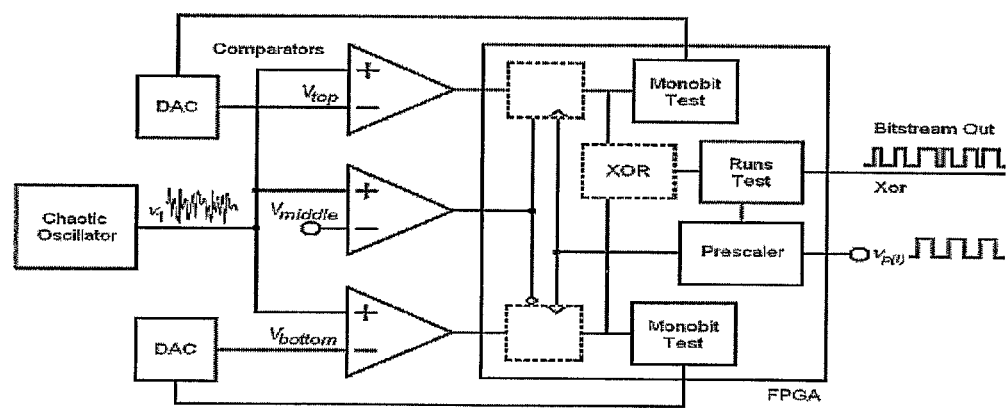
Figure 25:
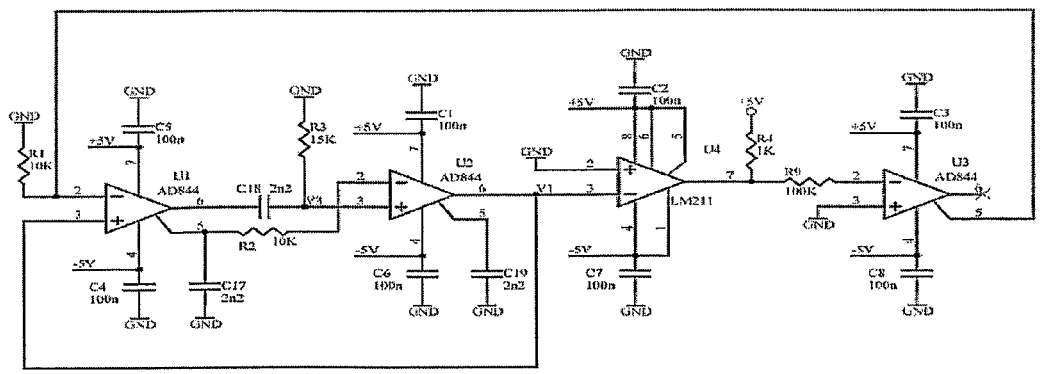
Figure 27:
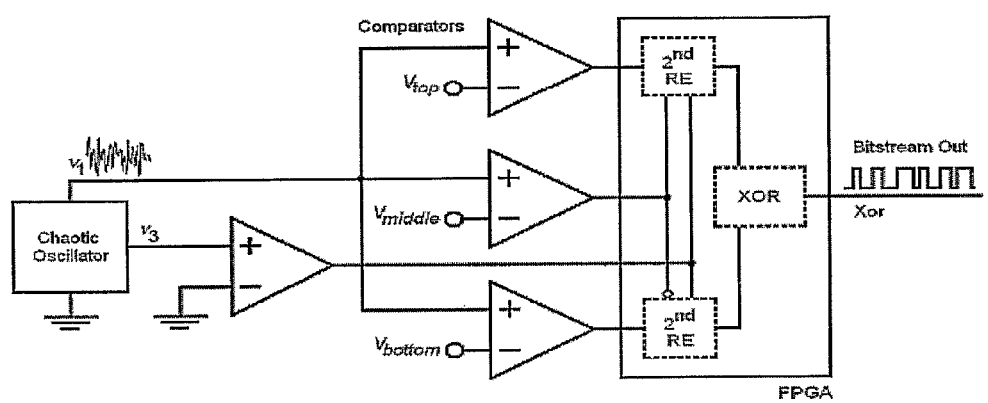
Figure 40:
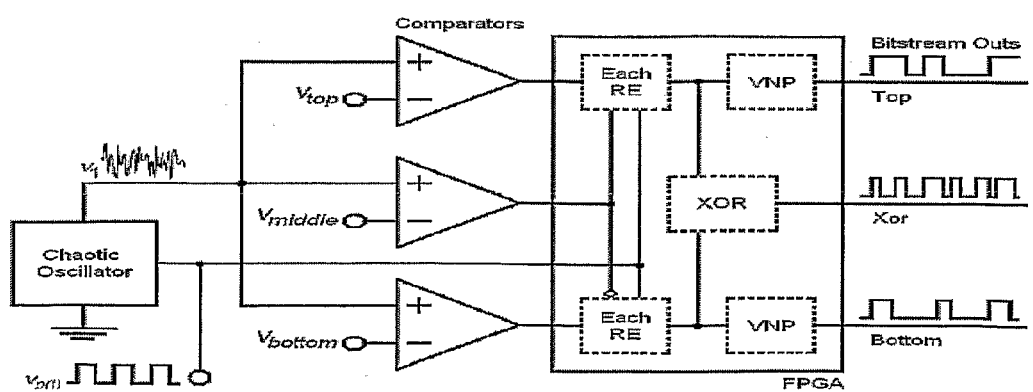

FIG. 1. Amplification of a noise source technique.
FIG. 2. Distribution of x1.
FIG. 3. Regional random number generation by using the periodic samples.
FIG. 4. Regional random number generation from the 1-dimensional section obtained at the status transitions.
FIG. 5. Regional random number generation from the 1-dimensional section of a non-autonomous chaotic oscillator obtained at the rising edge of $v_p(t)$.
FIG. 6. Frequency spectrum of v1.
FIG. 7. Autonomous MOS chaotic oscillator.
FIG. 8. Numerical analysis results of the chaotic oscillator.
FIG. 9. Chaotic attractor from the post-layout circuit simulation.
FIG. 10. Histogram of x1 obtained for $wtmod2\pi=0$.
FIG. 11. Experimental results of the chaotic oscillator.
FIG. 12. Histogram of v1 obtained at the rising edge of vp(t).
FIG. 13. Frequency spectrum of v1.
FIG. 14. Results of the numerical analysis of the chaotic oscillator.
FIG. 15. Histogram of x obtained for $wtmod2\pi=0$ (w=1=2).
FIG. 16. Circuit realization of the double-scroll attractor.
FIG. 17. Experimental results of the chaotic oscillator.
FIG. 18. Regional random number generation using chaotic oscillator.
FIG. 19. Histogram of v1 obtained at the rising edge of vp(t).
FIG. 20. Frequency spectrum of v1.
FIG. 21. The effect of offset compensation for Vtop.
FIG. 22. Results of the numerical analysis of the chaotic oscillator.
FIG. 23. Poincare section of the chaotic system defined as z(t)=0.
FIG. 24. Histogram of x obtained at z(t)=0.
FIG. 25. Circuit realization of the double-scroll attractor.
FIG. 26. Experimental results of the chaotic oscillator.
FIG. 27. Regional random number generation using chaotic oscillator.
FIG. 28. Histogram of v1 obtained at v3(t)=0 with dv3/dt>0.
FIG. 29. Proposed bipolar oscillator.
FIG. 30. Results of the numerical analysis of the bipolar oscillator.
FIG. 31. Proposed CMOS oscillator.
FIG. 32. Results of the numerical analysis of the CMOS oscillator.
FIG. 33. Zeros of the Melnikov function calculated on the homoclinic orbit shown in the upper light corner.
FIG. 34. Poincare map of the bipolar system for $\omega tmod2\pi=0:30$.
FIG. 35. Histogram of x obtained from the bipolar system for $\omega tmod2\pi=0:30$.
FIG. 36. Poincaŕe map of the CMOS system for $\omega tmod2\pi=0:55$.
FIG. 37. Histogram of x obtained from the CMOS system for $\omega tmod2\pi=0:55$.
FIG. 38. Experimental results of the bipolar chaotic oscillator.
FIG. 39. Experimental results of the CMOS chaotic oscillator.
FIG. 40. Regional random number generation using proposed chaotic oscillator alone.
FIG. 41. Histogram of v1 obtained 46 μsec after the rising edges of vp(t) for the bipolar circuit.
FIG. 42. Histogram of v1 obtained 35 μsec before the rising edges of vp(t) for the CMOS circuit.

The invention claimed is:

1. A method for generating binary random bits ($S_{(xor)i}$) regionally according to distribution based on a non-autonomous, continuous-time chaotic oscillator, comprising the step of:

generating non-invertible random binary bits regionally according to distribution of one state which corresponds to a waveform of the continuous-time chaotic oscillator, the generating further comprising steps of:

a. determining non-invertible appropriate sections where the distribution of samples has two regions, by considering only the samples belonging to a state $x_1$ by way of:

i. determining appropriate parameters set of normalized quantities, where the samples of the state x from a one dimensional section obtained at a status transition of another state $(x_2, x_3, \ldots, \text{or } x_n)$ defined as $x_{2\ldots n}(t)=x_{2\ldots n}(0)$ with $dx_{2\ldots n}/dt>0$ or $dx_{2\ldots n}/dt<0$, has two regions or, ii. adjusting appropriate $x_{2\ldots n}(0)$ values which corresponds to $v_{2\ldots n}(0)$, where the samples of the state $x_1$ from the one dimensional section obtained at the status transition of another state $(x_2, x_3, \ldots, \text{or } x_n)$ defined as $x_{2\ldots n}(t)=x_{2\ldots n}(0)$ with $dx_{2\ldots n}/dt>0$ or $dx_{2\ldots n}/dt<0$, has two regions or, iii. determining appropriate parameters set of normalized quantities, where periodic samples of the state $x_1$ obtained at rising or falling edges of an external periodical pulse signal, that is at times t satisfying $\omega t \bmod 2\pi = t_o$ ($\omega$ is the frequency of the pulse signal), has two regions or, iv. adjusting appropriate $t_o$, where the periodic samples of the state $x_1$ obtained at the rising or falling edges of an external periodical pulse signal that is at times t satisfying $\omega t \bmod 2\pi = t_o$ ($\omega$ is the frequency of the pulse signal), has two regions or, v. determining appropriate parameters set of normalized quantities, where the samples of the states $x_1$ from the one dimensional section obtained at the rising or falling edges of a periodical pulse signal used to drive the non-autonomous chaotic oscillator (at times t satisfying $\omega t \bmod 2\pi = t_o$ where $\omega$ is the frequency of the pulse signal and $0<t_o<1$ has two regions or, vi. adjusting appropriate $t_o$, where samples of the states $x_1$ from the one dimensional section obtained at the rising or falling edges of a periodical pulse signal used to drive the non-autonomous chaotic oscillator (at times t satisfying $\omega t \bmod 2\pi = t_o$ where $\omega$ is the frequency of the pulse signal and $0<t_o<1$) has two regions;

b. generating binary $S_{(top)i}$ and $S_{(bottom)i}$ from regional $x_{1i}$ values obtained from the appropriate section defined in step a above for regional thresholds according to the following equation:

$$S_{(top)i}=sgn(x_{1i}-q_{top}) \text{ when } x_{1i} \geq q_{middle}$$

$$S_{(bottom)i}=sgn(x_{1i}-q_{bottom}) \text{ when } x_{1i} < q_{middle}$$

where sgn(.) is the signum function, $q_{top}$ and $q_{bottom}$ are the thresholds for top and bottom distributions respectively and wherein $q_{top}$ and $q_{bottom}$ are chosen as thresholds because they are determined to be the medians of the top and bottom distributions, and $q_{middle}$ is the boundary between the distributions;

c. realizing offset compensations for $q_{top}$ and $q_{bottom}$ thresholds defined in step b above by implementing a Monobit Test;

d. realizing frequency compensation for the sampling frequency of $x_1$ by implementing a Runs Test to avoid oversampling of $x_1$;

e. generating random binary data $S_{(xor)i}$ using the binary sequences $S_{(top)i}$ and $S_{(bottom)i}$ defined in step b above according to the following equation:

$$S_{(xor)i}=S_{(top)i}(\text{XOR})S_{(bottom)i}$$

where exclusive-or (XOR) operation is exploited to eliminate the bias in order not to decrease the throughput.

2. A method according to claim 1, wherein: said state $x_1$ can also be another state $x_2, x_3 \ldots$ or $x_n$.

3. A method according to claim 1, wherein: said Monobit Test is a monobit test selected from a Statistical Test Suite of FIPS-140-1, FIPS-140-2 or NIST 800-22.

4. A method according to claim 1, wherein: said Runs Test is a runs test selected from a Statistical Test Suite of FIPS-140-1, FIPS-140-2 or NIST 800-22.

5. A method according to claim 1 for generating binary random bits ($S_{(xor)i}$) regionally according to distribution based on an autonomous continuous-time chaotic oscillator, comprising the steps of:

a. determining non-invertible appropriate sections where the distribution of samples has two regions, by considering only the samples belonging to a state $x_1$, by way of:

i. determining appropriate parameters set of normalized quantities, where the samples of the state $x_1$ from a one dimensional section obtained at a status transition of another state $(x_2, x_3, \ldots$ or $x_n)$ defined as $x_{2\ldots n}(t)=x_{2\ldots n}(0)$ with $dx_{2\ldots n}/dt>0$ or $dx_{2\ldots n}/dt<0$, has two regions or, ii. adjusting appropriate $x_{2\ldots n}(0)$ values which corresponds to $v_{2\ldots n}(0)$, where the samples of the state $x_1$ from the one dimensional section obtained at the status transition of another state $(x_2, x_3, \ldots$ or $x_n)$ defined as $x_{2\ldots n}(t)=x_{2\ldots n}(0)$ with $dx_{2\ldots n}/dt>0$ or $dx_{2\ldots n}/dt<0$, has two regions or, iii. determining appropriate parameters set of normalized quantities, where periodic samples of the state $x_1$, $x_2, \ldots x_n$, obtained at rising or falling edges of an external periodical pulse signal, that is at times t satisfying $\omega t \bmod 2\pi = t_o$ ($\omega$ is the frequency of the pulse signal), has two regions or, iv. adjusting appropriate $t_o$, where the periodic samples of the state $x_1, x_2, \ldots x_n$, obtained at the rising or falling edges of an external periodical pulse signal, that is at times t satisfying $\omega t \bmod 2\pi = t_o$ ($\omega$ is the frequency of the pulse signal), has two regions;

b. generating random binary sequences $S_{(top)i}$ and $S_{(bottom)i}$ from regional $x_{1i}$ values obtained from the appropriate section defined in claim 3.a for regional thresholds according to the following equation:

$$S_{(top)i}=sgn(x_{1i}-q_{top}) \text{ when } x_{1i} \geq q_{middle}$$

$$S_{(bottom)i}=sgn(x_{1i}-q_{bottom}) \text{ when } x_{1i} < q_{middle}$$

where sgn(.) is the signum function, $q_{top}$ and $q_{bottom}$ are the thresholds for top and bottom distributions, respectively, and wherein $q_{top}$ and $q_{bottom}$ are chosen as thresholds because the are determined to be the medians of the top and bottom distributions, and $q_{middle}$ is the boundary between the distributions;

c. realizing offset compensations for $q_{top}$ and $q_{bottom}$ thresholds defined in claim 3.b by implementing a Monobit Test;

d. realizing frequency compensation for the sampling frequency of $x_1$ by implementing a Runs Test to avoid oversampling of $x_1$;

e. generating random binary data $S_{(xor)i}$ by using the binary sequences $S_{(top)i}$ and $S_{(bottom)i}$ defined in claim 3.*b* above according to the following equation:

$$S_{(xor)i}=S_{(top)i}(XOR)S_{(bottom)i}$$

where exclusive-or (XOR) operation is exploited to eliminate the bias in order not to decrease the throughput.

6. A method according to claim 5, wherein: said state $x_1$ can also be another state $x_2, x_3 \ldots$ or $x_n$.

7. An apparatus comprising a random bit generator which is based on an autonomous or a non-autonomous, continuous-time chaotic oscillator and which relies on generating non-invertible random binary bits regionally according to distribution of a waveform of the continuous-time-chaotic oscillator, comprising:

a. three comparators in order to generate regional binary sequences $S_{(top)i}$ and $S_{(bottom)i}$ by using $V_{top}$, $V_{bottom}$, and $V_{middle}$ thresholds from the waveform of the continuous-time chaotic oscillator $v_1$ that has two regions, according to the following equation:

$$S_{(top)i}=sgn(v_{1i}-V_{top}) \text{ when } v_{1i} \geq V_{middle}$$

$$S_{(bottom)i}=sgn(v_{1i}-V_{bottom}) \text{ when } v_{1i} < V_{middle}$$

b. periodical pulse signal generator and two D flip-flops (D flip-flop) in order to sample regional binary $S_{(top)i}$ and $S_{(bottom)i}$ periodically;

c. two mono-bit test blocks (Monobit Test) and two digital-to-analog converters (DAC) to generate and compensate thresholds $V_{top}$ and $V_{bottom}$ used for top and bottom distributions, respectively;

d. a runs test block (Runs Test) and a prescaler block (Prescaler) to compensate the sampling frequency of $v_1$; and e. an exclusive-or (XOR) gate to eliminate the bias and generate random binary data $S_{(xor)i}$ using the binary sequences $S_{(top)i}$ and $S_{(bottom)i}$ according to the following equation:

$$S_{(xor)i}=S_{(top)i}(XOR)S_{(bottom)i}.$$

8. An apparatus according to claim 7, wherein: said Monobit Test is a monobit test selected from a Statistical Test Suite of FIPS-140-1, FIPS-140-2 or NIST 800-22.

9. An apparatus according to claim 8, wherein: said Runs Test is a runs test selected from a Statistical Test Suite of FIPS-140-1, FIPS-140-2 or NIST 800-22.

10. An apparatus according to claim 7, wherein: said Runs Test is a runs test selected from a Statistical Test Suite of FIPS-140-1, FIPS-140-2 or NIST 800-22.

11. An apparatus according to claim 7 for generating binary random bits regionally according to distribution based on a non-autonomous, continuous-time chaotic oscillator, including:

a. three comparators in order to generate regional binary sequences $S_{(top)i}$ and $S_{(bottom)i}$ by using $V_{top}$, $V_{bottom}$, and $V_{middle}$ thresholds from the waveform of the non-autonomous chaotic oscillator $v_1$ that has two regions;

b. periodical pulse signal generator ($v_p(t)$) which is used to drive the non-autonomous chaotic oscillator; a delay block (Delay) to adjust appropriate $t_o$, where $t_o$ is a time inside a period of $v_p(t)$ and two D flip-flops (D flip-flop) in order to sample regional binary sequences $S_{(top)i}$ and $S_{(bottom)i}$;

c. two mono-bit test blocks (Monobit Test) and two digital-to-analog converters (DAC) to generate and compensate thresholds $V_{top}$ and $V_{bottom}$ used for top and bottom distributions, respectively;

d. a runs test block (Runs Test) and a prescaler block (Prescaler) to compensate the sampling frequency of $v_1$; and e. an exclusive-or (XOR) gate to eliminate the bias and generate random binary data $S_{(xor)i}$ by using the binary sequences $S_{(top)i}$ and $S_{(bottom)i}$.

12. An apparatus according to claim 11, wherein: said Monobit Test is a monobit test selected from a Statistical Test Suite of FIPS-140-1, FIPS-140-2 or NIST 800-22.

13. An apparatus according to claim 12, wherein: said Runs Test is a runs test selected from a Statistical Test Suite of FIPS-140-1, FIPS-140-2 or NIST 800-22.

14. An apparatus according to claim 11, wherein: said Runs Test is a runs test selected from a Statistical Test Suite of FIPS-140-1, FIPS-140-2 or NIST 800-22.

15. An apparatus for generating binary random bits regionally according to distribution of a waveform of an autonomous or a non-autonomous, continuous-time chaotic oscillator, comprising:

a. three comparators in order to generate regional binary sequences $S_{(top)i}$ and $S_{(bottom)i}$ by using $V_{top}$, $V_{bottom}$, and $V_{middle}$ thresholds from the waveform of the continuous-time chaotic oscillator $v_1$ that has two regions, according to the following equation:

$$S_{(top)i}=sgn(v_{1i}-V_{top}) \text{ when } v_{1i} \geq V_{middle}$$

$$S_{(bottom)i}=sgn(v_{1i}-V_{bottom}) \text{ when } v_{1i} < V_{middle}$$

b. two D flip-flops (D flip-flop) and another comparator in order to sample regional binary sequences $S_{(top)i}$ and $S_{(bottom)i}$ from a one dimensional section of $v_1$ obtained at a status transition of another waveform $(v_2, v_3, \ldots v_n)$ defined as $v_{2 \ldots n}(t)=v_{2 \ldots n}(0)$;

c. two mono-bit test blocks (Monobit Test) and two digital-to-analog converters (DAC) to generate and compensate thresholds $V_{top}$ and $V_{bottom}$ used for top and bottom distributions, respectively;

d. a runs test block (Runs Test) and a prescaler block (Prescaler) to compensate the sampling frequency of $v_1$; and e. an exclusive-or (XOR) gate to eliminate the bias and generate random binary data $S_{(xor)i}$ by using the binary sequences $S_{(top)i}$ and $S_{(bottom)i}$ according to the following equation:

$$S_{(xor)i}=S(top)i(XOR)S_{(bottom)i}.$$

16. An apparatus according to claim 15, wherein: said Monobit Test is a monobit test selected from a Statistical Test Suite of FIPS-140-1, FIPS-140-2 or NIST 800-22.

17. An apparatus according to claim 16, wherein: said Runs Test is a runs test selected from a Statistical Test Suite of FIPS-140-1, FIPS-140-2 or NIST 800-22.

18. An apparatus according to claim 15, wherein: said Runs Test is a runs test selected from a Statistical Test Suite of FIPS-140-1, FIPS-140-2 or NIST 800-22.

* * * * *